US007236487B2

(12) United States Patent
Tadamura et al.

(10) Patent No.: US 7,236,487 B2
(45) Date of Patent: *Jun. 26, 2007

(54) SYSTEM FOR AND METHOD OF EXCHANGING SERVER DATA IN PACKET UNIT

(75) Inventors: Katsumi Tadamura, Shobara (JP);
Toshikazu Yasue, Chigasaki (JP); Seiji Kageyama, Yokohama (JP); Tetsuo Oura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 86 days.

This patent is subject to a terminal disclaimer.

(21) Appl. No.: 11/296,318

(22) Filed: Dec. 8, 2005

(65) Prior Publication Data

US 2006/0072570 A1 Apr. 6, 2006

Related U.S. Application Data

(63) Continuation of application No. 10/424,717, filed on Apr. 29, 2003, now Pat. No. 7,006,496, which is a continuation of application No. 09/161,731, filed on Sep. 29, 1998, now Pat. No. 6,621,816, which is a continuation of application No. 08/653,276, filed on May 24, 1996, now Pat. No. 6,141,338, which is a continuation of application No. 07/798,965, filed on Nov. 27, 1991, now Pat. No. 5,537,401.

(30) Foreign Application Priority Data

Nov. 30, 1990 (JP) .................................... 2-329402

(51) Int. Cl.
*H04L 12/56* (2006.01)
(52) U.S. Cl. ...................................... 370/352; 370/389

(58) Field of Classification Search ................ 370/389, 370/398, 428, 400, 401, 399, 397, 409, 352, 370/353, 355, 354, 356; 379/225, 230
See application file for complete search history.

(56) References Cited

U.S. PATENT DOCUMENTS

| 4,592,048 | A | 5/1986 | Beckner et al. ................ 370/60 |
| 4,764,919 | A | 8/1988 | Hunter et al. ................. 370/60 |
| 4,903,261 | A | 2/1990 | Baran et al. ................. 370/94.2 |
| 5,042,029 | A | 8/1991 | Hayakawa .................... 370/60 |

(Continued)

FOREIGN PATENT DOCUMENTS

EP 281099 7/1988

(Continued)

*Primary Examiner*—Ajit Patel
(74) *Attorney, Agent, or Firm*—Mattingly, Stanger, Malur & Brundidge, P.C.

(57) ABSTRACT

A packet switch apparatus including a plurality of connecting points, each being coupled to one of a plurality of data processing units, and apparatus for receiving a first packet including identification information of a first data processing unit via a first connecting point. The invention further includes a storage for storing correspondence between the first data processing unit and the first connecting point based on the identification information. Apparatus, responsive to reception of a second packet from a second data processing unit to be transmitted to the first data processing unit, transmits the second packet to the first data processing unit via the first connecting point based on the correspondence stored in the storage.

10 Claims, 32 Drawing Sheets

U.S. PATENT DOCUMENTS

| | | | |
|---|---|---|---|
| 5,051,982 A | 9/1991 | Brown et al. | 370/110.1 |
| 5,062,106 A | 10/1991 | Yamazaki et al. | 370/60 |
| 5,067,123 A | 11/1991 | Hyodo et al. | 370/60 |
| 5,072,441 A | 12/1991 | Szwarc | 370/60 |
| 5,090,011 A | 2/1992 | Fukuta et al. | 370/230 |
| 5,181,199 A | 1/1993 | Motoki et al. | 370/60 |
| 5,233,607 A | 8/1993 | Barwig et al. | 370/60 |
| 5,537,401 A * | 7/1996 | Tadamura et al. | 370/409 |
| 5,550,823 A | 8/1996 | Irie et al. | 370/413 |
| 5,610,918 A | 3/1997 | Kamo et al. | 370/395.5 |
| 5,699,369 A | 12/1997 | Guha | 371/41 |
| 6,141,338 A * | 10/2000 | Tadamura et al. | 370/352 |
| 6,198,726 B1 | 3/2001 | Hayami et al. | |
| 6,621,816 B1 * | 9/2003 | Tadamura et al. | 370/389 |
| 7,006,496 B2 * | 2/2006 | Tadamura et al. | 370/389 |

FOREIGN PATENT DOCUMENTS

| | | |
|---|---|---|
| JP | 58082355 | 5/1983 |
| JP | 58175072 | 10/1983 |
| JP | 60170068 | 9/1985 |
| JP | 60197046 | 10/1985 |
| JP | 62262597 | 11/1987 |
| JP | 63013547 | 1/1988 |
| JP | 63244167 | 10/1988 |
| JP | 6417185 | 1/1989 |
| JP | 6469141 | 3/1989 |
| JP | 64081454 | 3/1989 |
| JP | 1109847 | 4/1989 |
| JP | 01135253 | 5/1989 |
| JP | 01169842 | 7/1989 |
| JP | 01181264 | 7/1989 |
| JP | 01233947 | 9/1989 |
| JP | 1233947 | 9/1989 |
| JP | 226159 | 1/1990 |
| JP | 02179051 | 7/1990 |

* cited by examiner

FIG. 8

EXTENSION TABLE — 800

EXTENSION 1234 — 801

| TERMINAL IDENTIFICATION NUMBER | USER ID | LOGICAL CHANNEL NUMBER | DESTINATION |
|---|---|---|---|
| 8 | 0001 | 511 | SERVER 1 |
|   |   | 510 | SERVER 2 |
|   |   | 508 | SERVER 4 |
|   |   | 256 | — |
| 16 | 0014 | 511 | SERVER 1 |
|   |   | 507 | SERVER 5 |
|   |   | 256 | — |
| 23 | SERVER 1 | 1023 | USER 0014 |
|   |   | 1022 | USER 0108 |
|   |   | ⋮ | ⋮ |
|   |   | 645 | USER 0001 |
|   |   | ⋮ |   |
|   |   | 512 | — |
|   |   |   |   |

FIG. 9

| | SERVER 1 | 900 SERVER TABLE |
|---|---|---|
| 901 | SERVER 1 | |
| 902 | EXT. NO. | 1234 |
| 903 | TERMINAL IDENTIFICATION NUMBER | 23 |

| 904 LOGICAL CHANNEL NUMBER | USER ID OF DESTINATION (905) | EXT. NO. OF USER (906) |
|---|---|---|
| 1023 | 0014 | 1234 |
| 1022 | 0108 | 2422 |
| 1021 | 0075 | 5744 |
| ⋮ | ⋮ | ⋮ |
| 900 | 0311 | 2555 |
| ⋮ | ⋮ | ⋮ |
| 645 | 0001 | 1234 |
| ⋮ | ⋮ | ⋮ |
| 512 | — | — |

FIG. 10

ENTRY TABLE (1000)

| USER ID (1001) | USER (1002) | PASSWOED (1003) | ACCESS CLASS (1004) | CLASSI-FICATION | ATTRI-BUTE | EXT. NO. (1005) | TERMINAL IDENTFICATION NO. (1006) |
|---|---|---|---|---|---|---|---|
| 0001 | A | | 2 | — | — | 1234 | 8 |
| 0002 | B | | 4 | — | — | 1567 | 63 |
| 0003 | C | | 5 | — | — | 1440 | 11 |
| ---- | ---- | | ---- | | | ---- | ---- |
| 0100 | M | | 4 | — | — | 1010 | 43 |
| ---- | ---- | | ---- | | | ---- | ---- |
| 0311 | Q | | 7 | — | — | 2555 | 4 |
| ---- | ---- | | ---- | | | ---- | ---- |
| S001 | SERVER A | — | — | PRINTER | LASER PRINTER | 4233 | 25 |
| ---- | ---- | | ---- | | | ---- | ---- |

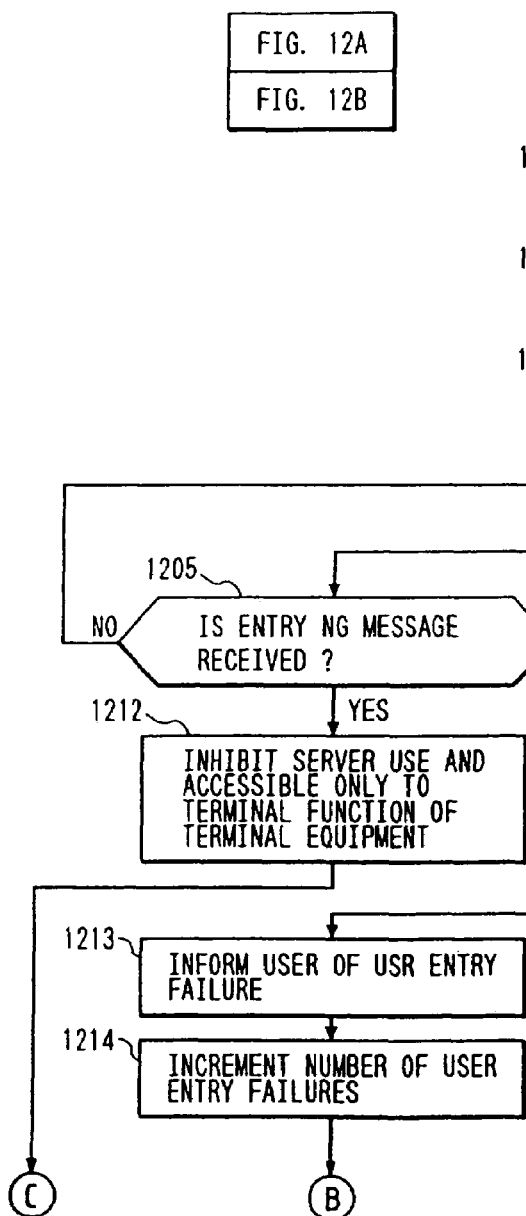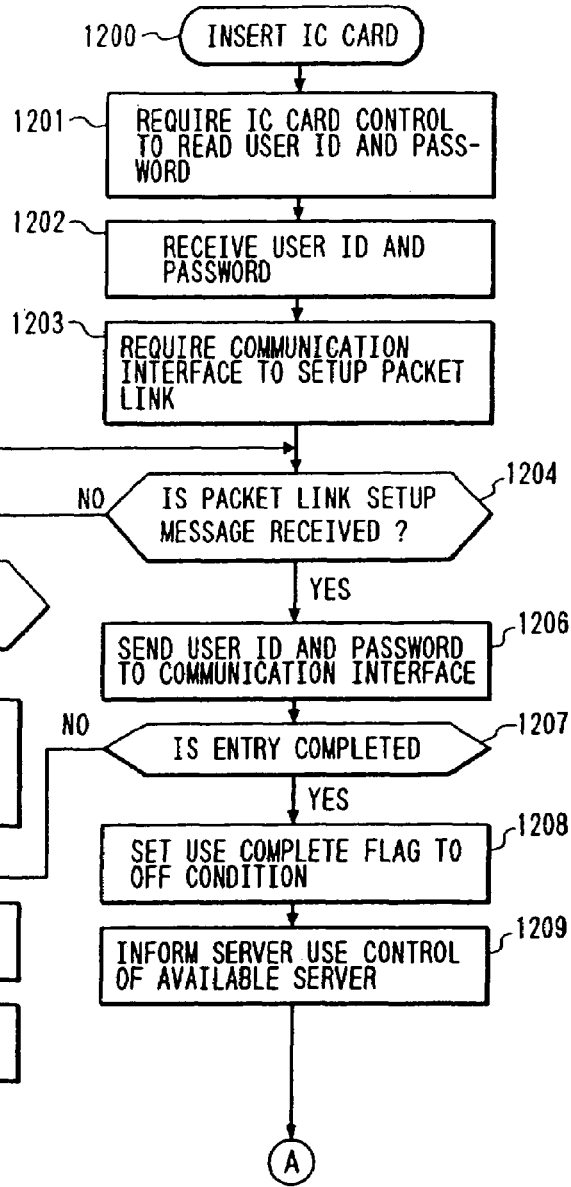

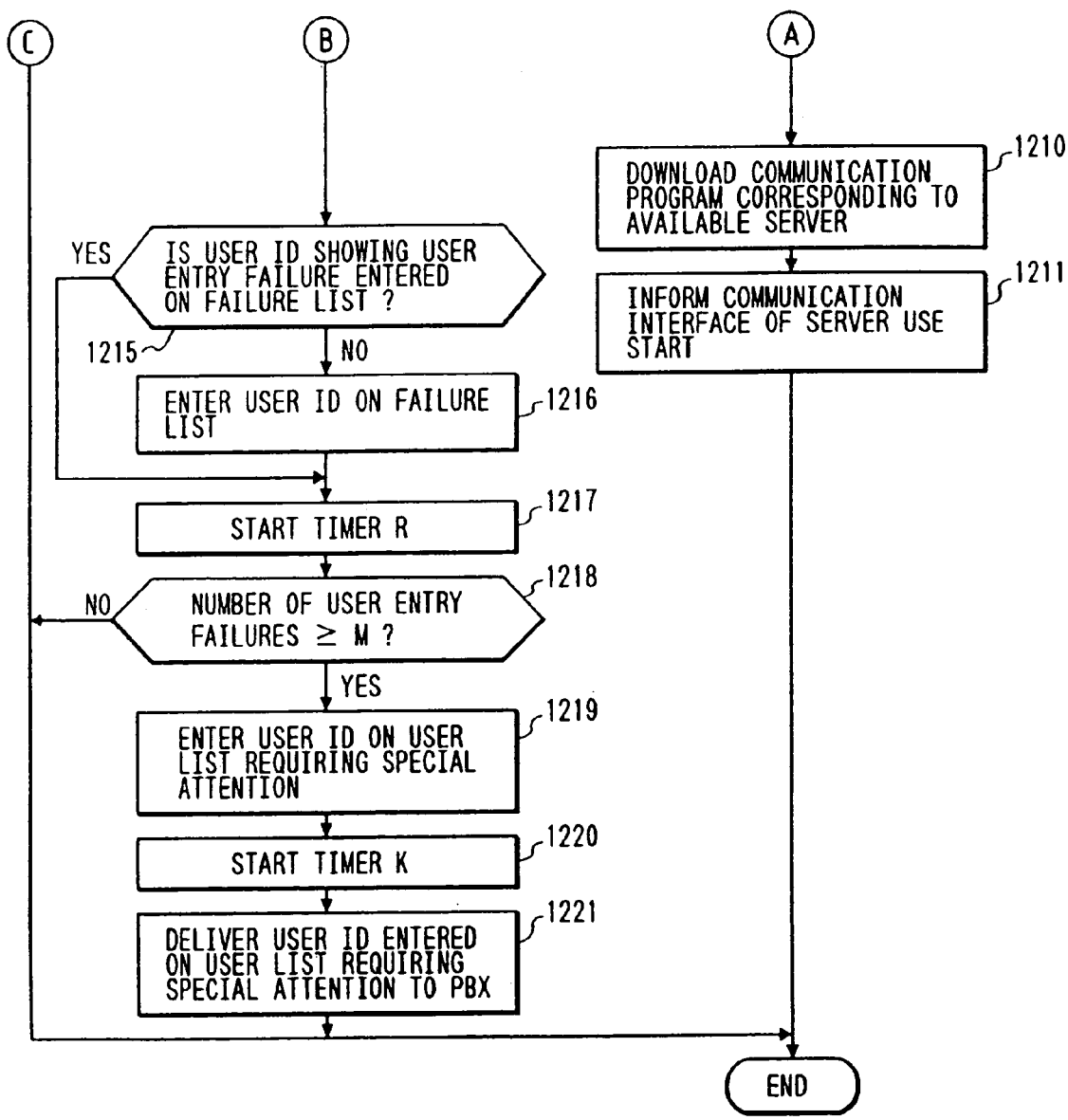

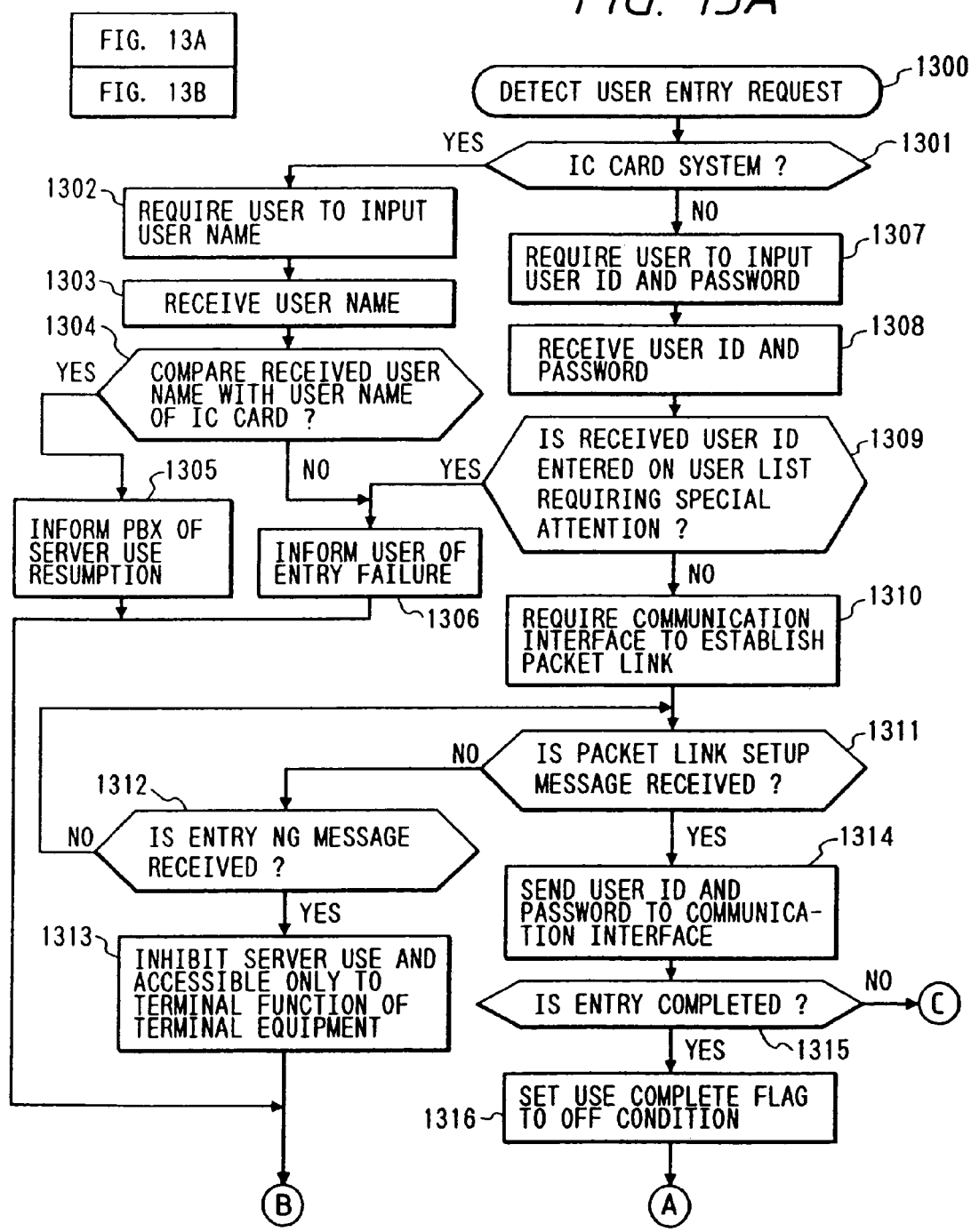

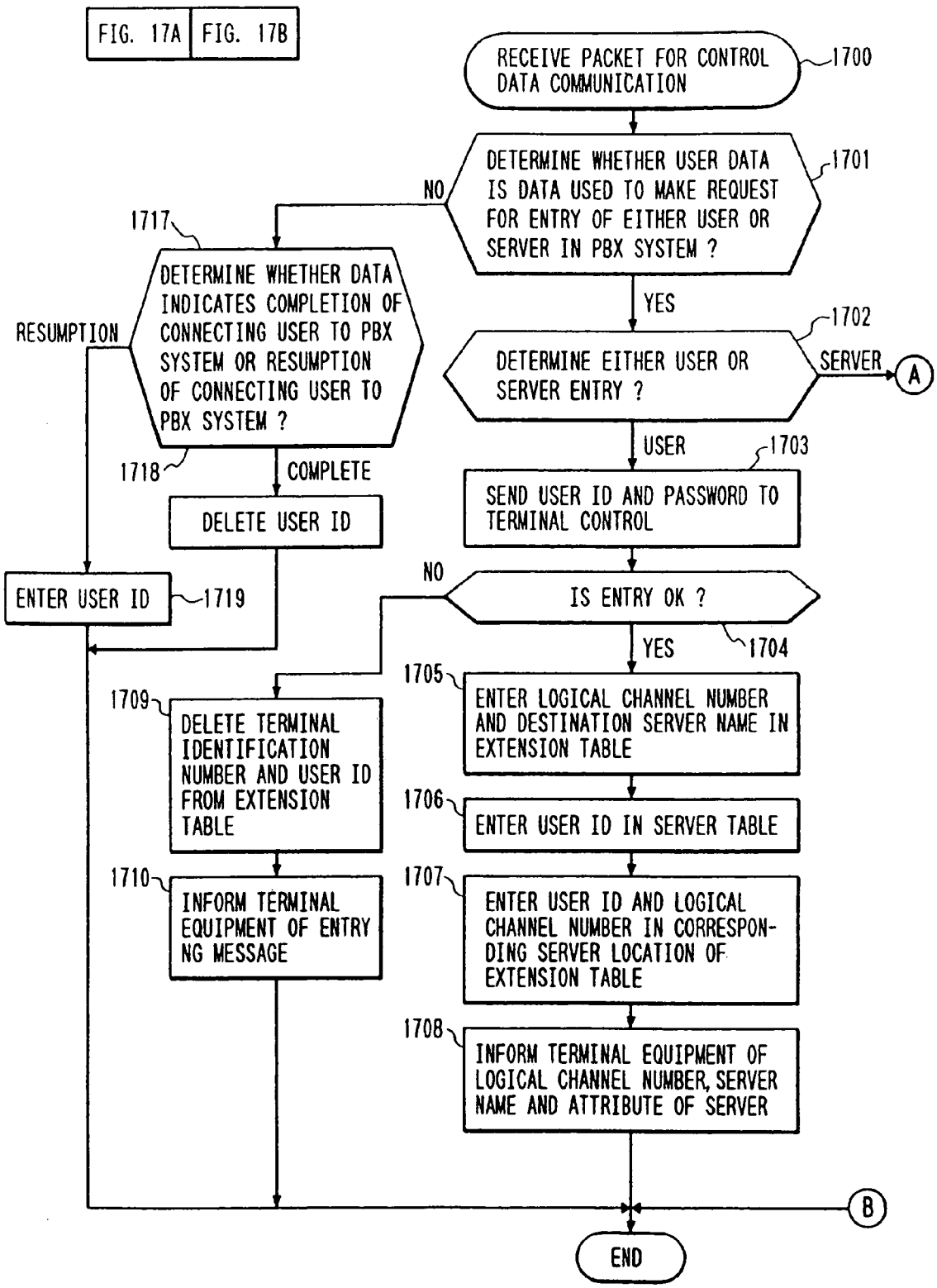

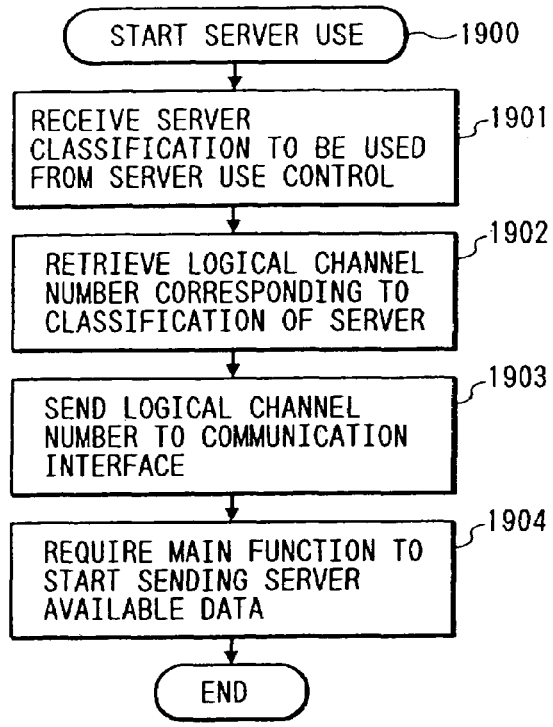
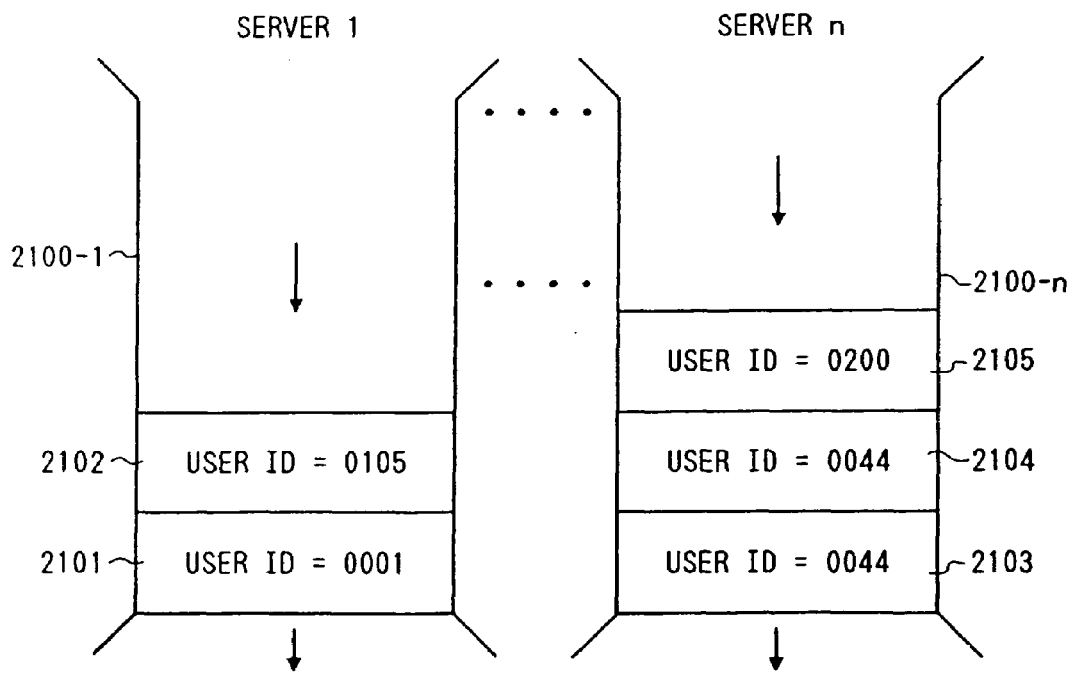

PUBLIC-LINE TABLE 2700

| PUBLIC LINE NUMBER 2701 | USER ID 2702 | LOGICAL CHANNEL NUMBER 2703 | CLASSIFICATION OF SERVER 2704 |
|---|---|---|---|
| 222 - 1111 | 0095 | 551 | SERVER 1 |
|  |  | 510 | SERVER 2 |
| ⋮ | ⋮ | ⋮ | ⋮ |

FIG. 32

SERVER TABLE (3200)

| SERVER 1 | | |
| --- | --- | --- |
| ADDRESS | | 4 |

| LOGICAL CHANNEL NUMBER | USER ID OF DESTINATION | EXT. NO. OF USER |
| --- | --- | --- |
| 1023 | 0014 | 1234 |
| 1022 | 0108 | 2422 |
| 1021 | 0075 | 5744 |
| ---- | ---- | ---- |
| 900 | 0311 | 2555 |
| 645 | 0001 | 1234 |
| 512 | — | — |

EXTENSION TABLE (3100)

| TERMINAL IDENTIFICATION NUMBER | EXTENSION 1234 | USER ID | LOGICAL CHANNEL NUMBER | DESTINATION |
| --- | --- | --- | --- | --- |
| 8 | | 0001 | 511 | SERVER 1 |
| | | | 510 | SERVER 2 |
| | | | 508 | SERVER 4 |
| | | | 256 | — |
| 16 | | 0014 | 511 | SERVER 1 |
| | | | 507 | SERVER 5 |
| | | | 256 | — |

3101, 3102, 3103, 3104, 3105

SYSTEM FOR AND METHOD OF EXCHANGING SERVER DATA IN PACKET UNIT

The present application is a continuation of application Ser. No. 10/424,717, filed Apr. 29, 2003, now U.S. Pat. No. 7,006,496; which is a continuation of application Ser. No. 09/161,731, filed Sep. 29, 1998, now U.S. Pat. No. 6,621,816; which is a continuation of application Ser. No. 08/653,276, filed May 24, 1996, now U.S. Pat. No. 6,141,338; which is a continuation of application Ser. No. 07/798,965, filed Nov. 27, 1991, now U.S. Pat. No. 5,537,401, the contents of which are incorporated herein by reference.

BACKGROUND OF THE INVENTION

The present invention relates to a server system of a type wherein the sharing of resources can be carried out using extensions of a private branch exchange (PBX), and more specifically to a system for and a method of exchanging server data in a packet unit, of a type wherein a plurality of users can simultaneously utilize the same resource.

As one of conventional arts, there is known one disclosed in Japanese Patent Application Laid-Open No. 1-109847. According to the disclosure, peripheral devices such as a printer, hard disc are electrically connected to an exchange network of a digital exchanger through a data interface unit. On the other hand, a data Processing unit is electrically connected to the exchange network of the digital exchanger through a data access unit. In the conventional art having such an arrangement, terminals are electrically connected to the data Processing unit and the peripheral devices (servers) by making use of exchange functions of the digital exchanger. The digital exchanger is provided with connecting shared buses for the purpose of control of the peripheral devices. The buses are interconnected to internal buses of a data processing control device. When a plurality of peripheral devices are connected to the exchange network, the data processing control device can accept operation requests of other peripheral devices while one peripheral device is in operation. Thus, the data processing control device connects a line for a peripheral device to which a use request has been made to a line for a corresponding peripheral device. According to the prior art, as described above, a plurality of peripheral, devices can simultaneously be utilized by connecting the peripheral devices to separate lines.

The above disclosure does not take into consideration a case where use requests are made to the same peripheral device from a plurality of terminals (lines). When one terminal makes use of the peripheral device, other terminals cannot use it, with the result that they had to wait for its use until a process of the terminal while being using the peripheral device is completed.

In the above prior art, the data processing unit needs dedicated control buses in order to control the peripheral devices. It is necessary to place connection terminals used to connect the peripheral devices to the exchange network and extending from the data interface unit, and the control buses in all Possible places where the peripheral devices can be disposed. In order to ensure that users can freely travel over the peripheral devices, it is thus necessary to provide data interface units in the digital exchanger by the number of possible places where the peripheral devices can be placed it is also necessary to place connection terminals extending from data interface units and control buses in all possible locations where the peripheral devices can be disposed. Thus, there was need for the provision of excessive equipment.

The above prior art does not give consideration as to the fact that a user travels over the peripheral devices so as to be connected to another line. Thus, when the user travels over the peripheral devices so as to change a connection line, a table indicative of the corresponding relation between numbers of the connection terminals for the connection of the peripheral devices, which numbers being held by the digital exchanger and practically-connected peripheral devices, was rendered necessary to be rewritten by either a user or a system controller. It was also necessary to inform all the users who make use of the peripheral devices of a connection line number change message.

In addition, the above prior art does not give consideration as to the security against information stored in disc devices. When a message relative to a line number to which a peripheral device is connected is received, a response to a connection request was made without reserve.

OBJECT OF THE INVENTION

It is therefore a first object of the present invention to provide a system for exchanging server data in a packet unit, of a type wherein a plurality of terminals can simultaneously utilize the same peripheral device (server).

It is a second object of the present invention to provide a system for exchanging server data in a packet unit, of a type wherein physical interfaces identical to telephones can provide the electrical connections between terminals and servers.

It is a third object of the present invention to provide a system for exchanging server data in a packet unit, of a type wherein servers connected to users who are using terminals and to a network can automatically be registered and/or deleted, thereby making it possible to freely change locations where the servers are placed and to cause the users to freely travel over the terminals.

It is a fourth object of the present invention to provide a system for exchanging server data in a packet unit, of a type wherein only users allowed to use servers can utilize the servers, and users capable of reading and writing data therefrom and therein can be assigned according to the degree of secrecy of information held by the servers.

SUMMARY OF THE INVENTION

A description will now be made of a summary of operations of the present invention, which range from the completion of the entry of users in terminals connected to a network to the time that the users can utilize servers. When a user entry is confirmed, a piece of terminal equipment acquires a user ID and a user's password. Thereafter, the terminal equipment is activated to carry out a process for setting up or establishing a packet link between the terminal equipment and a packet control on a PBX side. When the packet link is set up therebetween, the terminal equipment sends a server use request packet for the transmission of the user ID and the user's password to the packet control.

The packet control receives the server use request packet from the terminal equipment, and makes a check as to which terminal equipment has transmitted the user ID and the user password to the packet control. Thereafter, the packet control stores a physical address of the checked terminal equipment therein. Then, the packet control sends the user ID and the password to a terminal control.

The terminal control checks whether or not the user of the received user ID has been entered. A user name, a user ID, a user's password, and a user's information access level to all of which entry permission has been given, a server ID of each server connectable to a system, and the classification and attribute of each server, have been stored in the terminal control by a system controller. Then, such information is registered on a second table, and is deleted only when the system controller carries out information delete operation. The terminal control retrieves a user ID entry information from the information stored in the second table. If it is judged that the received user ID has already been registered on the second table, then the registered password is collated with the user's password. If it is judged to be an available user, then a check is made as to whether or not an available server is present by reference to the information access class of the user. Thereafter, information about a server name and a server attribute is sent to the packet control. If it is judged to be an unavailable user, an unavailable message is delivered to the packet control.

The packet control receives from terminal control an inquiry as to whether or not the user can utilize the system. If it is judged that the user can utilize it, then an available server ID and a logical channel number (LCN) of a specific logical channel, which corresponds to the server ID, are retrieved from a first table. Then, a server use response packet for the transmission of the retrieved information is sent to the corresponding terminal equipment. If it is judged that the user cannot utilize the system on the other hand, then an unavailable message is transmitted to the terminal equipment. Thus, the system can be prevented from being utilized by a user who has not been registered. When the terminal equipment receives a system available message from the PBX, it stores therein a received server ID and a logical channel number of a specific logical channel, which corresponds to the server ID. Thereafter, the terminal equipment sends request/data to a server in the form of a data packet added with a specific logical channel corresponding to the server that the user wants to use.

When the packet control detects that the server has been connected to a network and has been brought into a state in which it being capable of providing functions as the server, the packet control initiates a process for setting up a packet link between the server and the packet control. If the packet link is established, then the server sends a packet for the transmission of data such as a server ID, classification and attribute of the server to the packet control. Then, the packet control makes a judgment as to which server has transmitted the data. Thereafter, the packet control temporarily stores therein a physical address of a corresponding server, and sends the data to the terminal control.

Then, the terminal control determines whether or not the server of the received server ID has been registered. More specifically, the terminal control retrieves a second table on which a user ID, a user password, a server ID, classification of a server, etc. have been registered by a system controller. If it is judged that a received server ID has been registered on the second table, then the registered classification and attribute of the server are collated with the classification and attribute of the server, which correspond to the received server ID. If it is determined that the server has coincided with the registered server, then a "connectable message" is sent to the packet control. If it is determined to be negative, then an "unconnectable message" is delivered to the packet control.

The packet control receives from the terminal control an inquiry as to whether or not a server can be connected to the system. If it is judged that the server can be connected to the system, then the packet control serves to register or enter physical address information of the server and a server ID all of which have temporarily been stored, in a first table. Then, the packet control informs the server of a "connection complete message". If it is judged to be negative, then the packet control sends an "unconnectable message" to the server. Thereafter, a data link between the server and the packet control is released. Thus, the packet control is activated to prevent the system from being connected to a server which has not been registered. Thus, the packet control can transmit user use request data to the server.

A description will now be made of a summary of operations of the present invention, which range from the delivery of data to a system by a piece of terminal equipment in which a user has made an entry to the delivery of data to a server from the system side.

When the terminal equipment sends a data packet having, as a header, a logical channel number as an identifier corresponding to a specific server, to a PBX, a packet control carries out a process for entering data in means for accepting and registering data to be transmitted to a corresponding server. It is then determined whether or not the previous data outputted from the user who has transmitted the above data to the system has already been entered in the means. If it is determined to be negative, then the data is entered in the rearmost location of a use request data reception queue. If it is determined to be positive, then the packet control examines the data existing in the rearmost location, of the data which have already been entered in the use request data reception queue, and checks whether or not the data has reached the most suitable data size to be delivered to the server. If the answer is determined to be no, then some or all of the data sent from the user is assembled into the data existing in the rearmost location, of the data from the same user, which have already been entered in the use request data reception queue. If some of the data sent from the user is assembled into the data referred to above or some or all of the data is not completely assembled into the data, then the data is divided into the most suitable data size of a packet to be delivered to the server, after which each divided data is entered in the use request data reception queue. When the server is in a data acceptable state, the packet control sends to the server a packet for the transmission of data entered in the head of the use request data reception queue. At this time, an identifier for the identification of the user is inserted into the head of the packet to be sent to the server. Thus, the user can transmit data to an intended server.

A description will now be made of the summary of the operations of the present invention at the time that an improper user who has not been allowed to use the system has made an entry trial in the system. A user first makes an entry in the terminal equipment and the terminal control carries out an inquiry as to its entry. As a result, it is judged that the user has not been allowed to use the system. When the terminal equipment receives a system unavailable message from the PBX, the terminal equipment is activated to set up a counter for counting the number of use refusals of the server system, which is notified from the system side. In addition, the terminal equipment stores therein a user ID used when the entry trial of the user is made, and starts a first timer for counting the time from the time at which a server system use refusal or rejection message is received to the time at which a given period has elapsed. When the terminal equipment receives again a server system use rejection message from the system before the first timer is timed out, the terminal equipment restarts the first timer, thereby incrementing the counter. When the value counted by the counter exceeds the number of times N defined in advance at the time of the design of the system before the first time is timed out, the terminal equipment judges that an improper user is now entering the system. Accordingly, the terminal equipment informs the system of a message indicative of the entry of the improper user in the system, followed by starting of a second timer for counting the time required to separate the terminal equipment from the system. When the second timer is in operation, the terminal equipment refuses the entry of any user in the system. When an improper user invasion or entry message is received from the terminal equipment, the PBX is activated to inform a system controller of a message indicative of the fact that the improper user being now entering the system. The previously described data to be transmitted between the terminal equipment and the server is transmitted in a code or crypto mode exclusive of data used for the setting up and the release of the data link. Thus, the improper user cannot easily enter into the system even when the improper user who has not been allowed to use the system, attempts to enter into the system.

According to the present invention, as described above, a server system can be utilized by making use of -extensions of an exchanger. Therefore, a user can freely travel over each terminal equipment which makes use of a server. Since both a telephone and the server system can be utilized through the same network, it is unnecessary to doubly lay cables for their purposes. By making use of the identical logical channel corresponding to each server device, a plurality of pieces of terminal equipment can simultaneously set up or establish a packet link and accept a plurality of use requests to the identical server. Therefore, any user is no longe±- laced on a process waiting state because server' use requests do not compete with each other. When the user attempts to use the server, a server name to be used is assembled into data, and thus-processed data is delivered to the system. In addition, the system examines a physical address of the server, followed by delivery of data to the server. It is therefore unnecessary for the user to store an extension number of an extension connected with a server, etc. when the user makes use of the server. Since the terminal equipment which has continuously failed in the system entry through a given number of times or more, is separated from the system, a system entry trial is rendered difficult. In addition, an information access level is established for each user, and a server available for each user is assigned based on the access level thus established. Therefore, each server having a variety of security levels can be connected to the system. Furthermore, server use request data received from the user is temporarily registered in a queue, and such data is shaped into a data size capable of providing the most suitable server's process for each server when it is entered in the queue, thereby making it possible to efficiently carry out server's data processing.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 8 is a diagram for describing an extension table;

FIG. 9 is a diagram for describing a server table;

FIG. 10 is a diagram for describing an entry table used for the PBX server system;

FIG. 11 is a diagram for describing a logical channel assignment table;

FIG. 12 is a flowchart for describing the sequence of processes carried out by terminal equipment with an IC card control upon entry of a user in the system;

FIG. 19 is a flowchart for describing the sequence of server use data delivery processes performed by a server use control;

FIG. 21 is a diagram for describing the structure of the server queue;

FIG. 31 is a diagram for describing an extension table managed by a packet control of the PBX in the system according to the second embodiment;

FIG. 32 is a diagram for describing a server table managed by the packet control shown in FIG. 31;

DETAILED DESCRIPTION OF THE PREFERRED EMBODIMENTS

Figure 1:
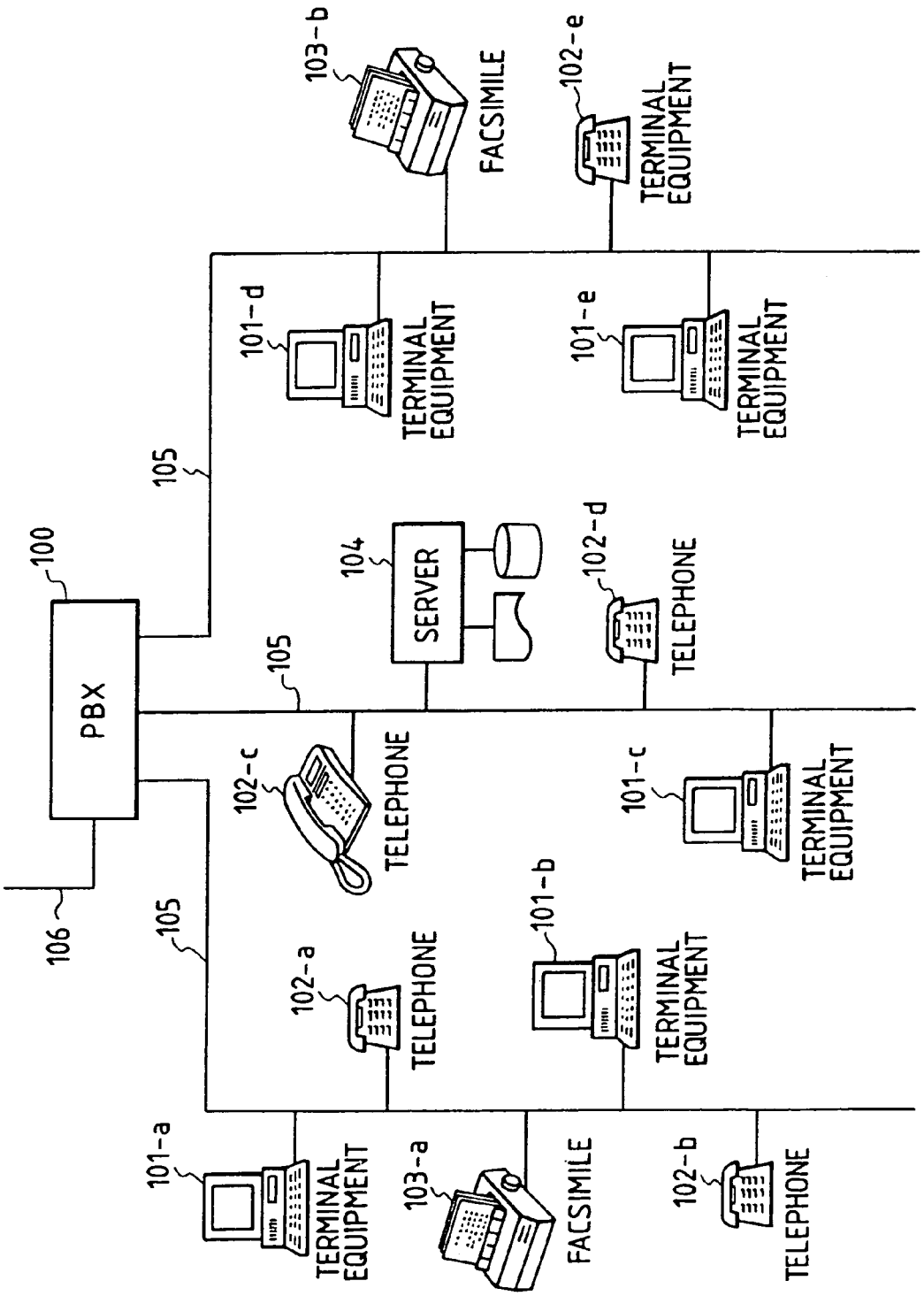
FIG. 1 is a diagram showing a PBX server system according to a first embodiment of the present invention.
Figure 33A:
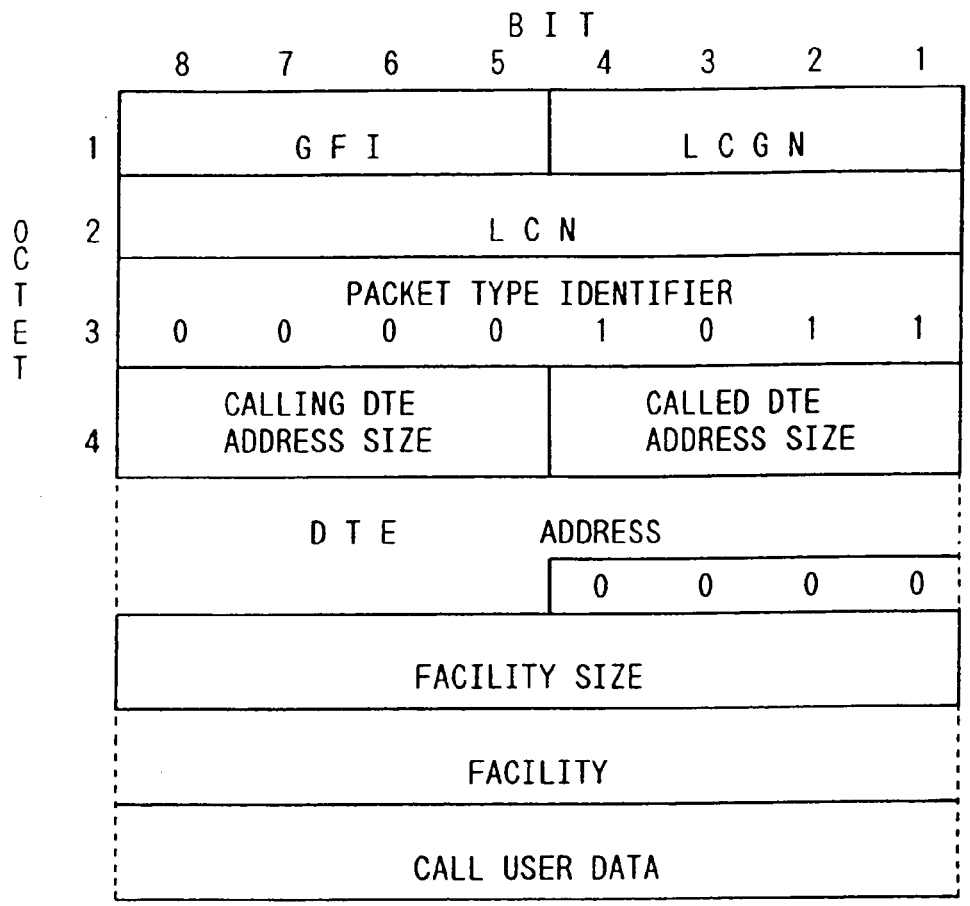
FIG. 33 is a diagram showing one example of a packet format employed in the present invention.
Figure 33B:
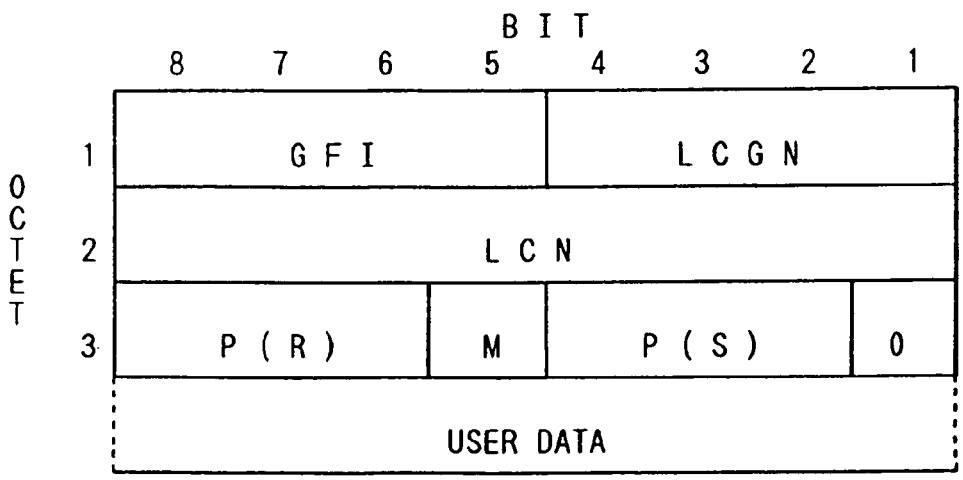
Figure 34:
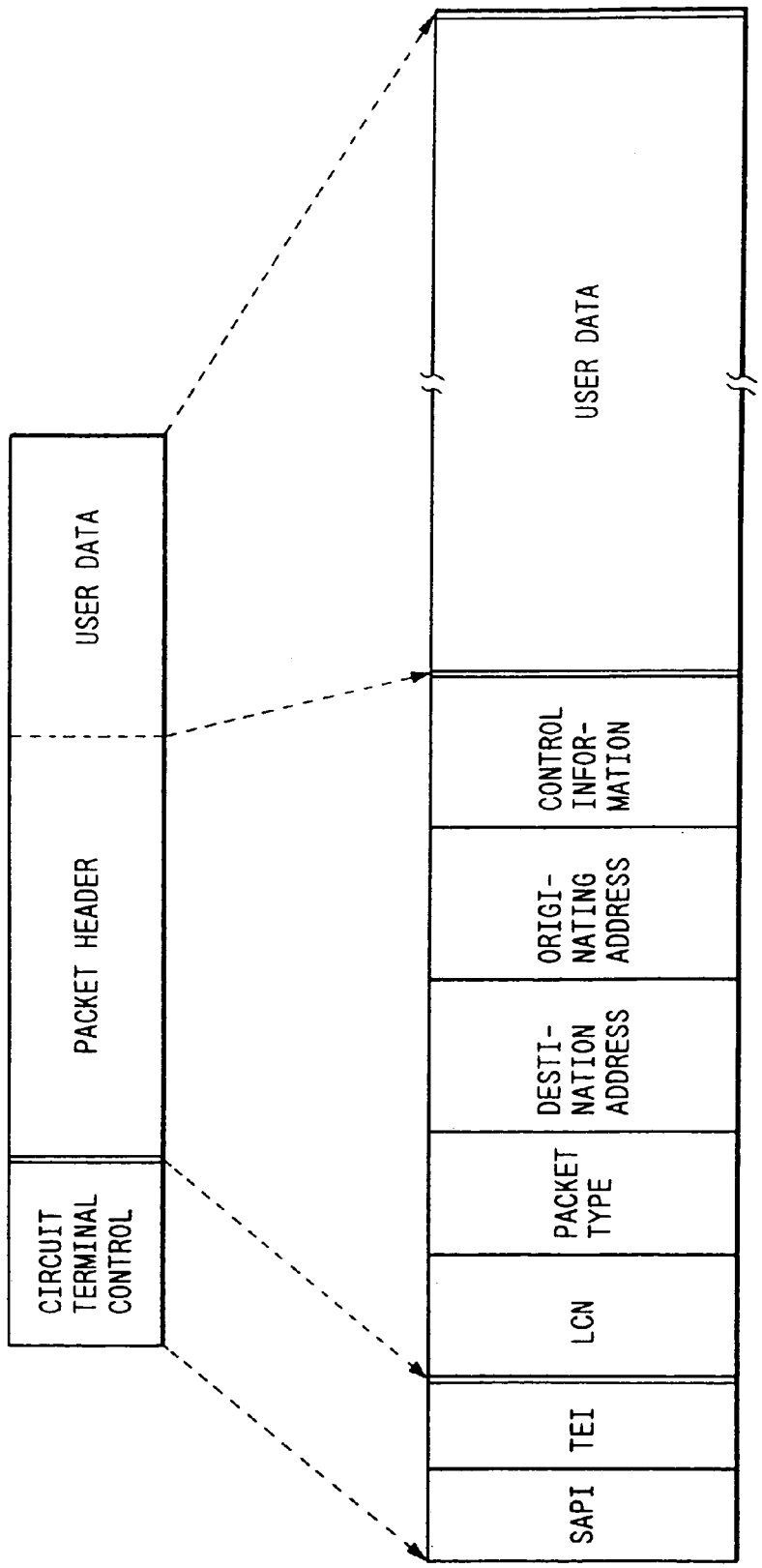
FIG. 34 is a diagram illustrating one example of a transmission format employed when a packet used in the present invention is transmitted using a control signal channel.

Preferred embodiments of the present invention will hereinafter be described with the accompanying drawings. FIG. 1 shows a PBX server system according to a first embodiment to which a system for exchanging server data in a packet unit, i.e., a sever data packet exchange system of the present invention is applied. The PBX server system basically comprises a digital public branch exchange (hereinafter referred to as a "PBX") 100, a plurality of pieces of terminal equipment 101, and a server 104. The terminal equipment 101 and the server 104 can be connected to extensions 105 of the PBX through physical interfaces identical to those of devices such as telephones 102, facsimiles 103, the devices being used for a public telephone communication line. As has been provided in the advice 1.441 (ISDN user/network interface) of CCITT, each extension 105 of the PBX 100 is used to send a control signal transmitted and received between the PBX 100 and each terminal equipment 101 for the purpose of terminal connection and an information signal used to make a telephone call and transmit data, through separate or discrete channels. Each extension 105 has at least one control signal channel and one information signal channel. A plurality of devices can be connected to one extension 105, and they can simultaneously communicate with one another. The PBX server system is activated to transmit data to the server 104 from the terminal equipment 101 through the PBX 100. In addition, the transfer of data between the terminal equipment and the PBX and between the server and the PBX is carried out in the form of a packet unit, using either the control signal channel (D channel) or the information signal channel (B channel) in accordance with the provision of the advice X.25 of CCITT. The exchange of a data packet delivered to the sever from the terminal equipment is performed in the PBX 100. FIG. 33 shows a packet format provided in the advice X.25 of CCITT. FIG. 33(a) illustrates a format of a call control packet. The format comprises a general format identifier (GFI), a logical channel group number (LCGN), a logical channel number (LCN), a packet type identifier, a packet header including a called terminal address, etc. necessary for the connection of a calling side to a called destination or terminal, and user data divided into blocks of given sizes. FIG. 33(b) shows a format of a data packet. The format comprises a general format identifier (GFI), a logical channel group number (LCGN), a logical channel number (LCN), a packet header including sequence numbers (P(R), P(S)) of the packet, and user data divided into blocks of predetermined sizes. In order to distinguish between special communications carried out between the terminal equipment 101 and the extension control 206, a logical channel number is applied to each packet in the form of the packet format referred to above. A packet communication is carried out for every destinations of respective terminal equipment connected to one physical line, so that it can be distinguished from others by an identifier of data indicative of the so-applied logical channel number. Thus, when a logical channel number corresponding to address information is firstly applied to one of packets and a packet communication service is initiated, the PBX can subsequently recognize a desired destination by simply applying the logical channel number to data. FIG. 34 illustrates a transmission format of a user packet based on the D channel provided in the advice I.441, I.462 of CCITT. In other words, there are provided a service access point identifier (SAPI) used to manage terminal information for each physical line and indicate either call control information or packet information, and a circuit-terminal control indicative of a number (TEI) is used to identify each multipoint-connected terminal, etc.

Figure 2A:
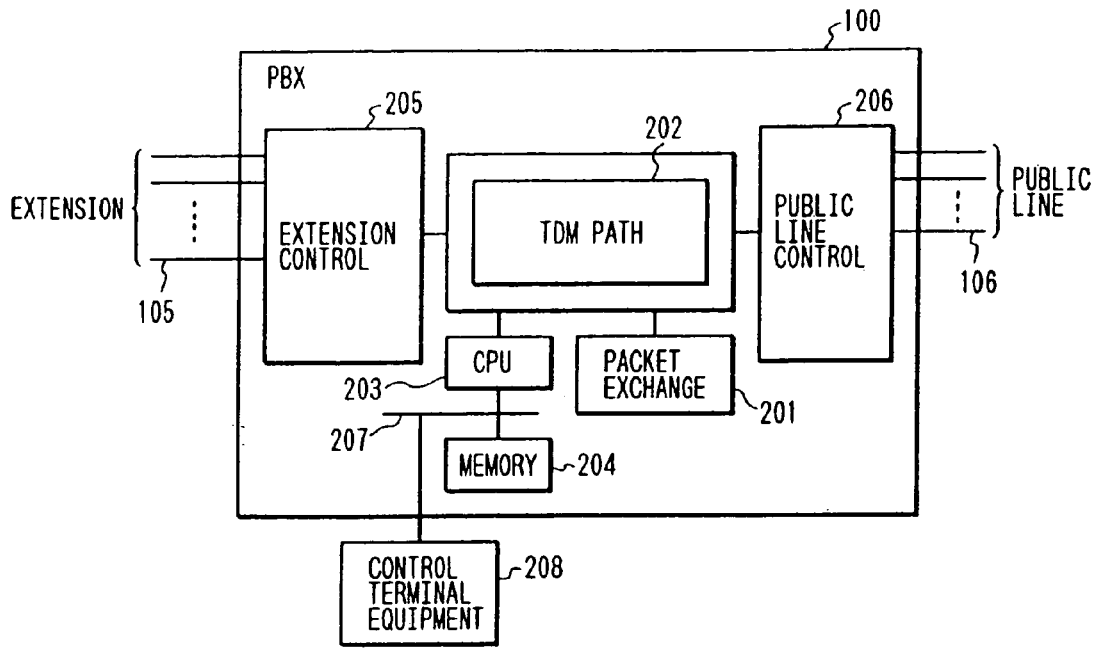
FIG. 2 is a diagram schematically showing an internal structure of a PBX in the system shown in FIG. 1.
Figure 2B:
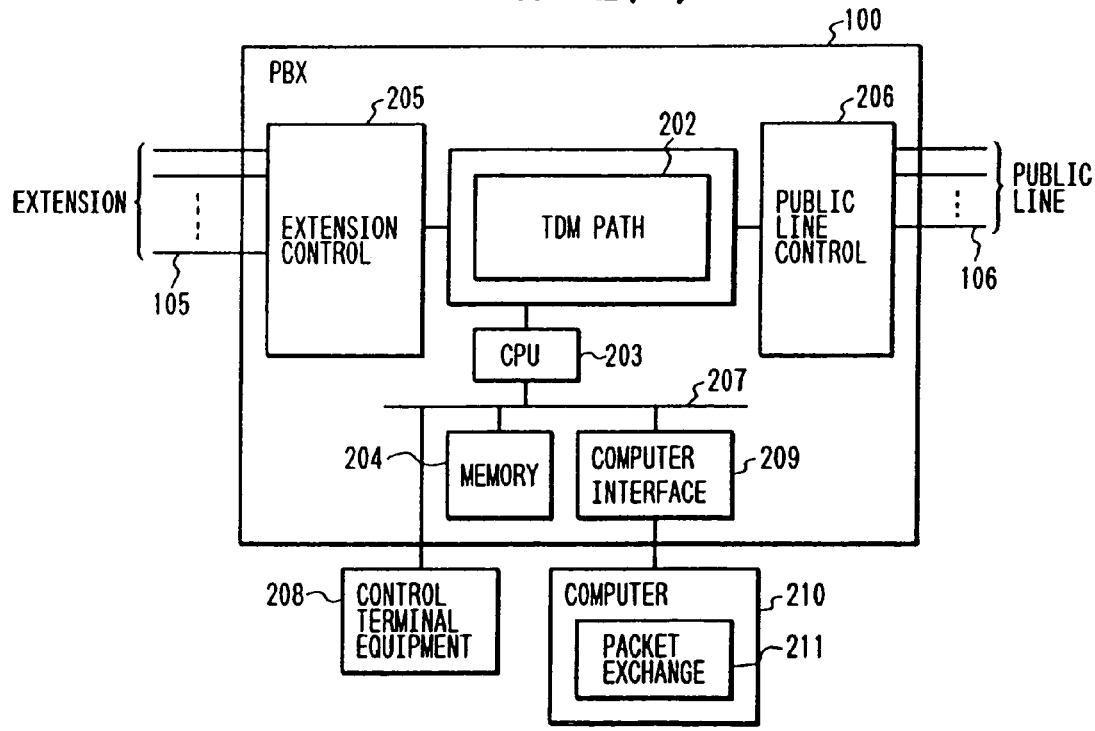

FIG. 2 is a diagram schematically showing the structure of the inside of the PBX 100. FIG. 2(a) shows the structure of the PBX in which a packet exchange 201 for changing over packet data from the terminal equipment to the server is directly connected to a time-division multiplex (TDM) path 202 in the PBX 100. Also connected to the TDM path 202 are a central processing unit (CPU) 203 for controlling the entire operation of the PBX 100, an extension control 205 for controlling the electrical connections among the extensions 105, and a public line control 206 for controlling the electrical connections among public lines 106. A memory 204 and control terminal equipment 208 are electrically connected via a CPU bus 207 to the CPU 203, and the memory 204 stores therein information about the attribute of each extension and communication records. The control terminal equipment 208 is used to cause a system controller to examine the condition of the PBX in use and to enter the attribute of the extension and change it to another. FIG. 2(b) illustrates the structure of the PBX in which a computer 210 is electrically connected to a CPU 203 of a PBX 100 through a computer interface 209, with the computer 210 having in its inside a packet exchange 211 identical to the above packet exchange 201. Other elements of structure are identical to those shown in FIG. 2(a). According to the structure of FIG. 2(a), the extension control 205 first receives data supplied from one of a plurality of pieces of terminal equipment electrically connected to the extensions 105. Then, the data thus received passes through the TDM path 202, after which it is delivered to the packet exchange 201. Thereafter, the data is sent to a server electrically connected to one extension 105 through the transmission path opposite the above path. According to the structure of FIG. 2(b), data supplied from one of a plurality of pieces of terminal equipment electrically connected to the extensions 105 is first received by the extension control 205, and passes through the TDM path 202, followed by delivering to the CPU 203. Then, the CPU ~03 delivers the so-received server use data to the computer interface 209 via the CPU bus 207. After that, the computer interface 209 sends the data to the packet exchange 211 of the computer 210 provided outwardly of the PBX 100. Further, the data is supplied to the server electrically connected to one extension 105 through the opposite route referred to above.

Figure 3:
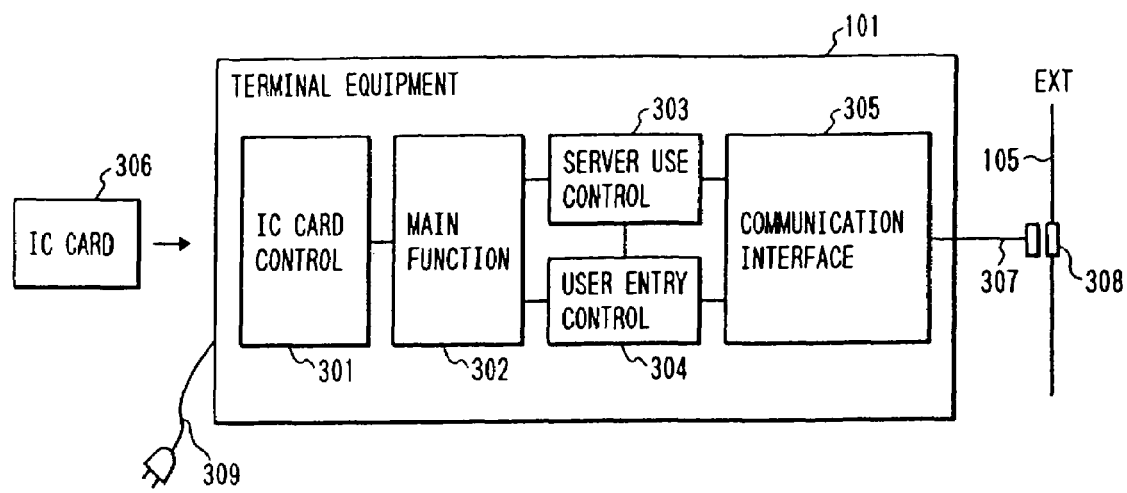
FIG. 3 is a diagram schematically illustrating an internal structure of terminal equipment in the system shown in FIG. 1.

FIG. 3 shows the structure of the terminal equipment 101 connected to the extension 105, for furnishing communication services of the PBX server system according to the first embodiment of the present invention, to the user. The terminal equipment 101 basically comprises an IC card control 301 for accepting a user entry in response to the insertion of an IC card 30 therein, a main function 302 for providing functions identical to those of generally-used personal computers and work stations, a server use control 303, a user entry control 304 and a communication interface 305. In addition, the terminal equipment 101 is electrically connected to a connector 308 of the extension 105 via an extension cable 307 similar to that employed in a normally-used telephone, after which it is connected via the connector 308 to the extension 105. When the terminal equipment 101 is electrically connected to the extension 105 of the PBX 100, the communication interface 305 communicates with the extension control 205 of the PBX 100, using the control signal channel and the information signal channel of the extension 105. The server use control 303 is used to carry out communication control of data produced when the user makes use of the server 104. The user entry control 304 is used to examine whether or not the user entered in the terminal equipment 101 has been given a system use permit.

Figure 4:
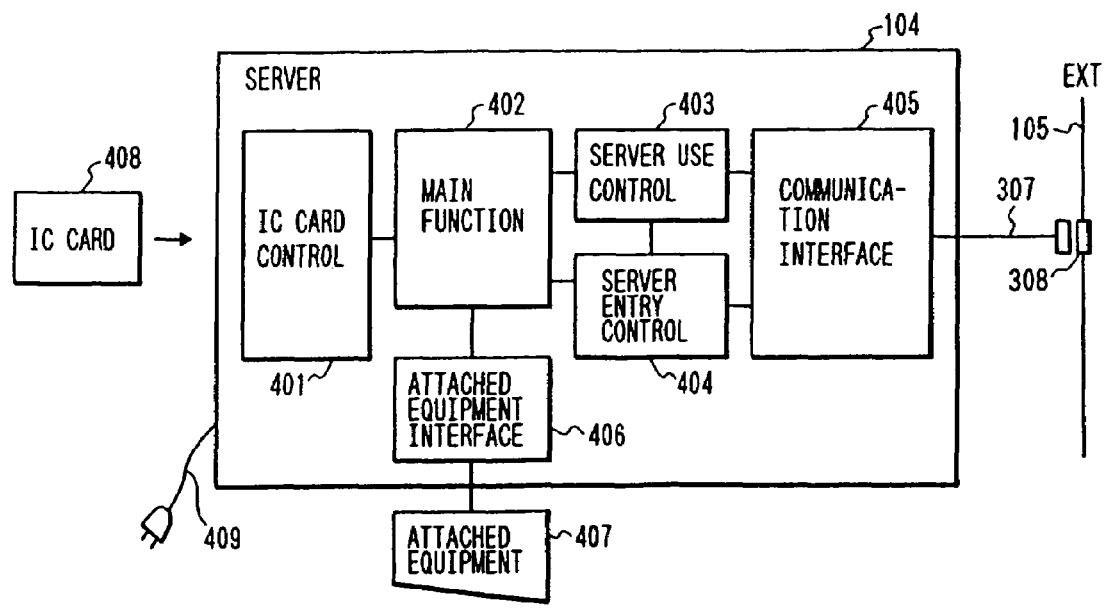
FIG. 4 is a diagram schematically depicting an internal structure of a server in the system shown in FIG. 1.

FIG. 4 shows, as an illustrative example, the structure of the server 104 electrically connected to the extension 105, for furnishing communication services of the PBX server system according to the first embodiment of the present invention to the user. The sever 104 comprises an attached equipment interface 406 for providing interface, i.e., an electrical inter-connection between an attached equipment 407 controlled by the server 104 and a main function 402, an IC card control 401 for initiating the entry of a server in the system in response to the insertion of an IC card 408 therein, the main function 402 for providing a normal function (similar to that of a known server) serving as the server, a server use control 403, a server entry control 404, and a communication interface 405. In addition, the server 104 is electrically connected to a connector 308 of the extension 105 via an extension cable 307 as a physical interface similar to that employed in a normally-used telephone, after which it is connected via the connector 308 to the extension 105. When the server is electrically connected to the extension 105 of the PBX 100, the communication interface 405 communicates with the extension control 205 of the PBX 100, using the control signal channel and the information signal channel of the extension 105. The server use control 403 is used to carry out communication control of data for using a server, which has been delivered via the PBX 100 to the server 104 from the terminal equipment 101 which has been used by the user. The server entry control 404 is used to examine whether or not the server entered in the PBX server system has already been registered in the system.

Figure 5:
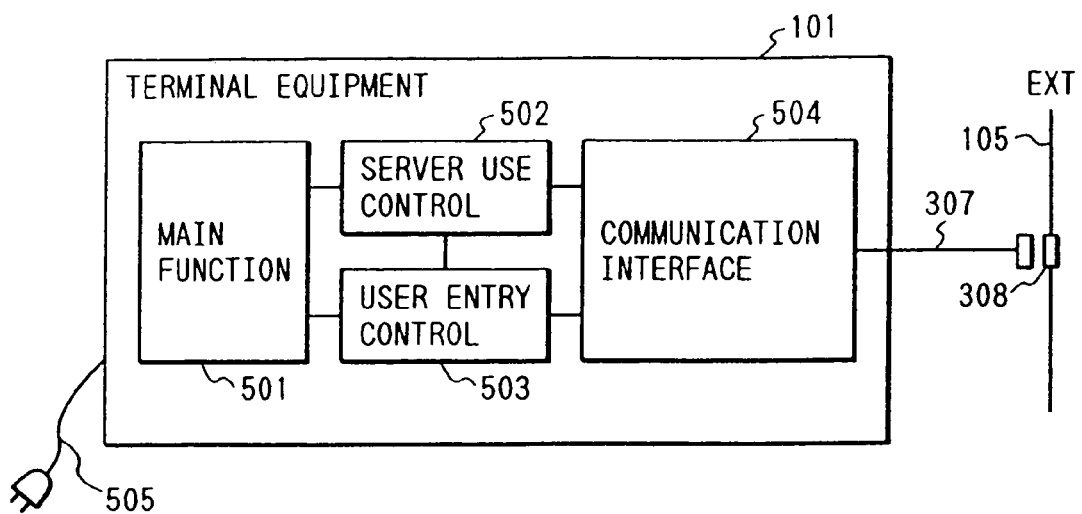
FIG. 5 is a diagram schematically showing an internal structure of another example of the terminal equipment shown in FIG. 1.

FIG. 5 shows another example of the terminal equipment 101 electrically connected to the PBX server system according to the first embodiment of the present invention. The terminal equipment shown in FIG. 5 differs from that illustrated in FIG. 3 in that the terminal equipment 101 is not provided with the IC card interface and the IC card control 301. Thus, the terminal equipment according to the second embodiment of the present invention is activated to accept the entry of a user in the system when the user employs keys to thereby input a user ID and a user password. Other components, i.e., a main function 501, a server use control 502, a user entry control 503, a communication interface 504 have the same functions as those of the components shown in FIG. 3, respectively.

Figure 6:
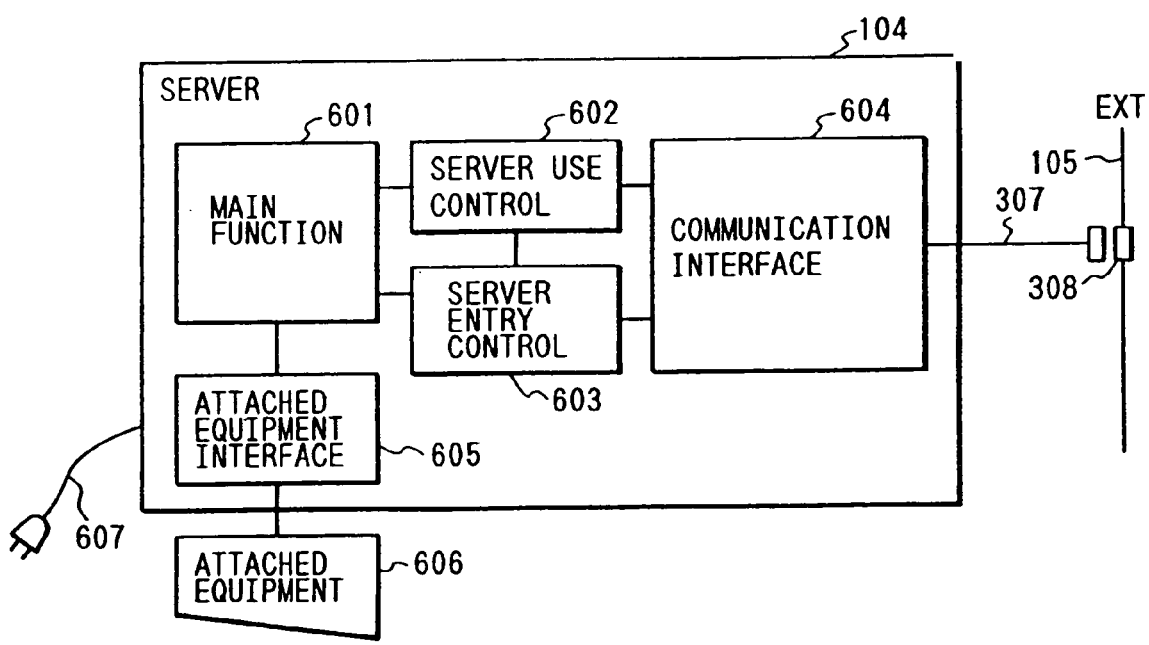
FIG. 6 is a diagram schematically illustrating an internal structure of another example of the server shown in FIG. 1.

FIG. 6 illustrates another example of the server 104 for providing the communication service of the PBX server system according to the first embodiment of the present invention. The present server is different from the server shown in FIG. 4 in that the present server 104 is not provided with the IC card interface and the IC card control 401. Thus, such a server initiates a process for the connection of the server to the system when an operator who makes a request to connect the server to the system, is keyed to thereby input a server ID and information about the classification and attribute of the server. Other components, i.e., a main function 601, a server use control 602, a user entry control 603, a communication interface 604 and an attached equipment interface 605 have the same functions as those of the components shown in FIG. 4, respectively.

Figure 7:
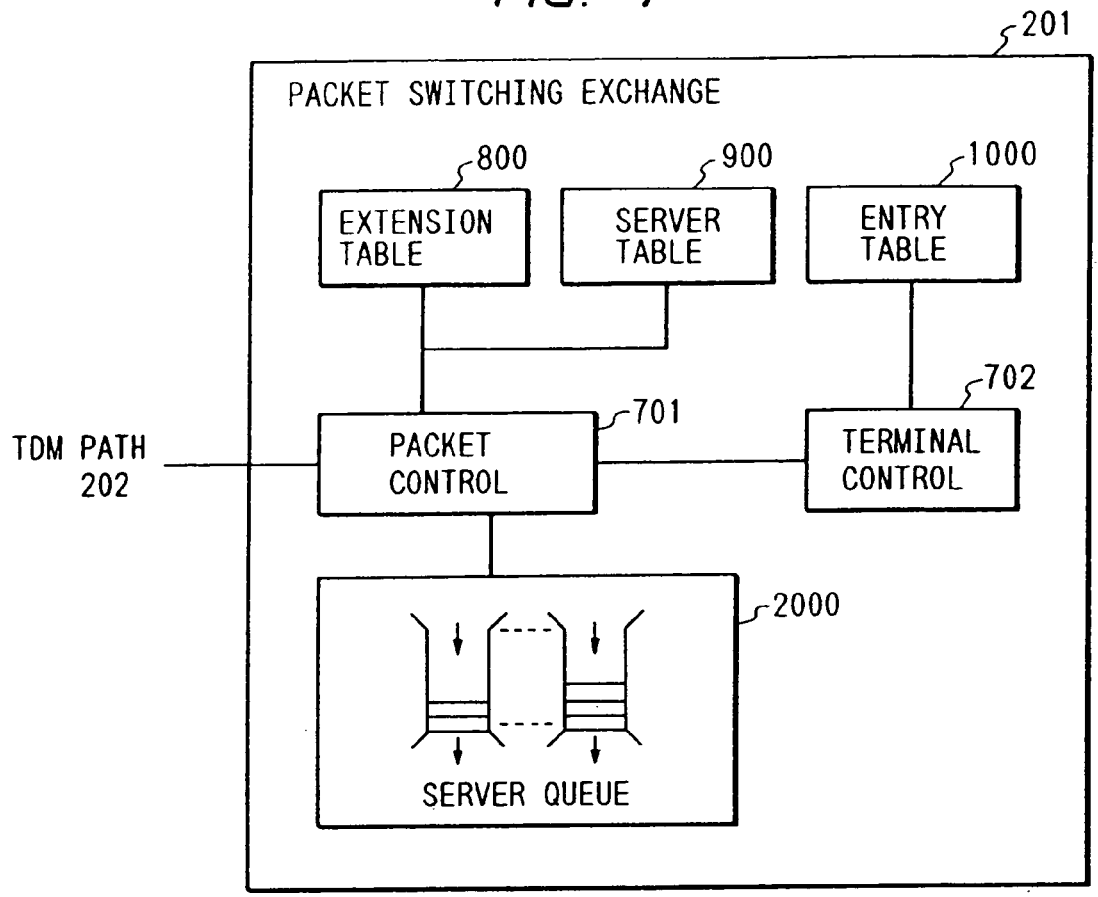
FIG. 7 is a diagram showing the structure of the inside of a packet exchange.

FIG. 7 shows the structure of the inside of the packet exchange 201 (or 211). The packet exchange 201 comprises a packet control 701 used to carry out the data transfer based on a packet exchange between each of the terminal equipment 101 and the server 104 both connected to the extension 105 of the PBX 100 and the PBX 100, and a terminal control 702 used to manage or control the state of each terminal handled by a user allowed to utilize the PBX server system according to the first embodiment of the present invention, and the state of the server 104 entered so as to provide the communication service of the PBX server system being connected to each extension 105.

The packet control 701 includes an extension table 800 shown in FIG. 8, and manages or controls information about the terminal equipment 101 and its user connected for each extension of the PBX sever system and information about the server 104 connected for each extension thereof. The extension table 800 has an extension number 801 serving as an index, a terminal identification number 802, and a user ID 803. Further, when attached equipment is of terminal equipment, the transfer of data in a logical multiplex mode can be realized upon transmission of data on or through a data link between the PBX and each terminal equipment with a view to using the server. Thus, the extension table 800 is used to distinguish between specific communications carried out between the terminal equipment 101 and the extension control 206. In addition, the extension table 800 also includes a logical channel number 804 assigned to each server, and a destination 805 indicative of a called destination of data transmitted using the logical channel number 804. When the server is now connected to the extension, a server ID is entered in the user ID 803, whereas a logical channel number corresponding the user making use of the server referred to above is registered in the logical channel number 804. In addition, the user ID is entered in the destination 805. Thus, when it is desired to transmit data to a desired server the user wants to use, a logical channel number corresponding to each server is assigned without specifying physical addresses (extension number, terminal identification number) of the server. Even when data is transmitted from the server to terminal equipment the user is now employing, a logical channel number corresponding to a user name is assigned in the same manner as described above.

FIG. 9 shows a server table 900 employed in the packet control 701. The server table 900 includes a server 901 serving as an index, an extension number 902 to which the server is connected, a terminal identification number 903 in which physical address information is entered, a logical channel number 904 assigned each time a user makes use of a server, a user ID 905 corresponding to the logical channel number 904, and an extension number 906 to which each user of the user ID 905 is connected. The packet control 701 is activated to logically connect between the user and the server by reference to a combination of the extension table 800 and the server table 900. More specifically, a server name the user wants to employ is recognized based on the logical channel number 804 assigned when the user transmits data to the PBX 100, and the server name thus recognized is used to retrieve the server table 900, thereby determining an extension number 902 and a terminal identification number 903 corresponding to the server. As a result, a physical address for transmitting data can be obtained. Then, a logical channel number 904 corresponding to a user as a data transmit origin is assigned, followed by transmitting data to the PBX. When data to be transmitted from the server to the user is received, an extension number 906 of the user of destination is retrieved from the server table 900, and the retrieved extension number is used to retrieve the extension table, thereby determining a terminal identification number 802. At this time, at least one of logical channels for data links between the PBX 100 and either the terminal equipment 101 or the server 104 has been reserved for the transmission of control information between the packet control 701 and either the terminal equipment 101 or the server 104. According to the examples illustrated in FIGS. 8 and 9, a logical channel number "256" is used to cause the control information to be transferred between the packet control 701 and the terminal equipment 101. In addition, a logical channel number "512" is used to cause the control information to be conveyed between the packet control 701 and the server 104. When the PBX 100 supports known packet exchange communication functions as provided in the advice X.25 of CCITT, a logical channel number employed in known data communication based on a packet switching or exchange mode, and a logical channel number used in data communication intended for the use of the PBX server system, are separately established in the PBX 100.

FIG. 10 shows an entry table 1000 for the PBX server system, which is included in the terminal control 702. There has been entered in the entry table 1000, information about the user, which is input from the control terminal 208 of the PBX 100 by the controller of the PBX server system. More specifically, the entry table 1000 includes user's intrinsic information such as a user ID 1001 of a user who can use the PBX server system, a user name 1002, a password 1003 and an access class 1004, etc. and information such as an extension number 1005 and an terminal identification number 1006, which varies with terminal equipment entered or registered by the user. In addition, the entry table 1000 also stores a server ID of a server providing communication services, a server name, server's classification, server's attribute information, an extension number of the extension 105 to which the server is connected, and a server's terminal identification number, all of which being inputted by the controller of the PBX server system. The terminal control 702 checks using the entry table 1000 whether or not a user ID, a password and the like received when the user is entered in the system and the user accepts a server available message, are correct.

FIG. 11 shows an LCN assignment table 1100 to be held in the server use control 303 (or 502) of the terminal equipment 101. The LCN assignment table 1100 includes an LCN number 1101 assigned when data is transmitted to the server 104, classification 1102 of the server 104 as a destination to which data is transmitted using the LCN number, and an attribute 1103 of the server 104. The terminal control 702 checks whether or not the user ID and the password fed from the terminal equipment 101 in which the user has made an entry, are correct. If the answer is determined to be yes in the terminal equipment 702, then the information referred to above is delivered to the terminal equipment 101 in which the user has entered. At this time, the information is registered on the LCN assignment table 1100. When the user has finished using the terminal equipment 1101, the contents of information thus entered are deleted from the LCN assignment table 1100.

Figure 13B:
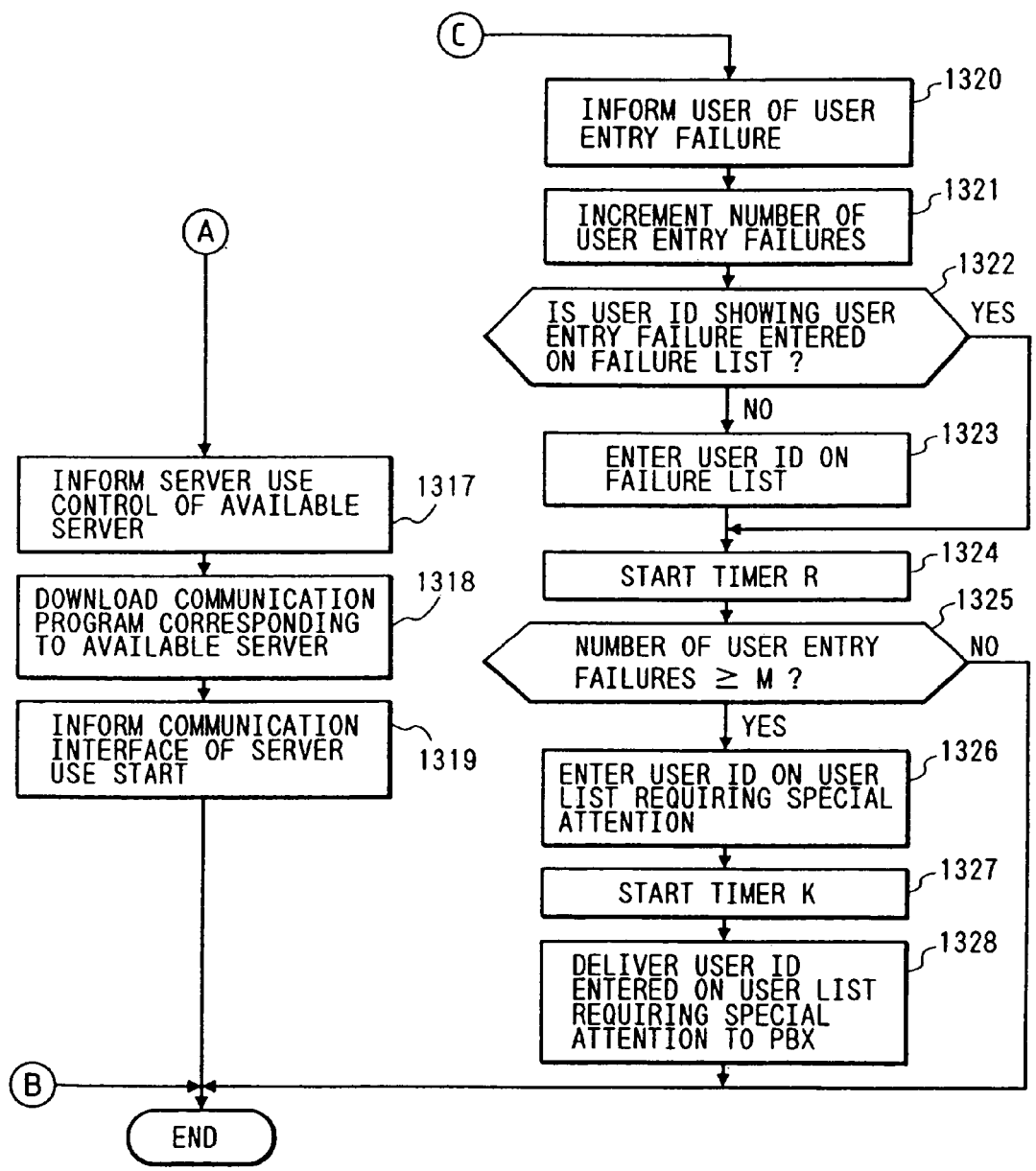
FIG. 13 is a flowchart for describing the sequence of processes performed by terminal equipment free of an IC card control upon entry of a user in the system.

FIGS. 12 and 13 are flowcharts for describing the sequence of processes carried out by the terminal equipment 101, for detecting the entry of a user in the terminal equipment 101 of the PBX server system according to the first embodiment of the present invention so as enable a server 104 to be used from the terminal equipment 101 side.

FIG. 12 is a flowchart for describing the sequence of processes carried out by the user entry control 304 of the terminal equipment 101 with the IC card control 301 upon entry of a user in the system. When the user inserts an IC card 306 for the system entry into the terminal equipment 101 (Step 1200), the IC card control 301 detects the insertion of the IC card 306 therein, and informs the user entry control 304 of the result of its insertion. The user entry control 304 requires the IC card control 301 to read a user ID and a user's password from a given memory location of the IC card 306 (Step 1201). The user entry control 304 receives therein the user ID and the password read from the IC card by the IC card control 301 in response to the above request (Step 1202). Then, the user entry control 304 requires the communication interface 305 to set up or establish a packet link for carrying out data communication in a packet exchange mode between the terminal equipment 101 and the PBX 100 (Step 1203). Then, the user entry-control 304 waits for a packet-link setup message from the communication interface 305 (Step 1204). At this time, if no response is given from the PBX even when a predetermined period of time has passed after the communication interface 305 has been required to set up the packet link, or if a packet-link setup refusal or negative response is received from the PBX, then the communication interface 305 sends a user entry failure or negative (NG) message to the user entry control 304. In addition, the communication interface 305 checks whether or not this message has been received (Step 1205). When the user entry control 304 receives a packet-link setup message from the communication interface 305, the user ID and the password read from the IC card in Step 1202 are correspondingly delivered to the communication interface 305 as data to be firstly transmitted from the terminal equipment 101 to the PBX 100 (Step 1206). Then, the user entry control 304 waits for either a user entry complete message or a user entry MG message, which is sent from the communication interface 305 (Step 1207). When the user entry control 304 receives the user entry complete message for the use of the system, a use complete flag indicative of the state of the terminal being utilized by the user is set to an OFF condition (Step 1208). The user entry complete message received from the communication interface 305 includes a server ID of a server available to the user, a logical channel number used for data transmission, etc., and data entered in the logical channel assignment table 1100. Now, the user entry control 304 sends the data entered in the logical channel assignment table 1100 to the server use control 303 (Step 1209). If necessary, a communication program for employing a server which the PBX 100 has specified in response to the entry complete message is downloaded from the IC card 306 (Step 1210). Then, the server use control 303 sends a data communication start message for the use of the server to the communication interface 305, thereby making it possible to use the server from the terminal equipment 101 side (Step 1211) When the entry NG message is received from the communication interface 305 in Step 1205, it is judged that a fault or malfunction has occurred in the system. Thus, the terminal equipment 101 is rendered incapable of carrying out data communication using a logical channel for the purpose of the use of the server. As a result, the user can use only the terminal equipment (Step 1212). When the user entry NG message is received from the communication interface 305 in Step 1207, an entry failure message is sent to the user who has tried some system entries (Step 1213). Then, the number of the system entry failures is incremented (Step 1214). It is determined (in Step 1215) whether or not the user ID employed by the user who has failed in the system entry has already been registered on an entry failure user ID list. If it is determined to be negative in Step 1215, then the user ID is newly entered in the entry failure user ID list (Step 1216). Then, a timer R having a period Tr is started (Step 1217). The timer R is activated for every user IDs. If the entry of the identical user ID in the system does not fail after the period Tr has passed, then the user ID is deleted from the entry failure user ID list. If the user ID has already been entered in the entry failure user ID list, then the timer R corresponding to the user ID is activated again (Step 1217). It is then determined (in Step 1218) whether or not the number of the entry failures has reached a given M. If the answer is determined to be no, then the routine procedure terminates. If the answer is determined to be yes, then all the user IDs which have been registered on the entry failure user ID list are entered in a user list requiring special attention, i.e., a remark user list (Step 1219). Then, a timer K having a period Tk is started (Step 1220). The timer K is used to measure or count a period during which the user ID5 are stored in the remark user list. When the timer K is timed out, a corresponding user ID is deleted from the remark user list. After the starting of the timer K has been made, the user IDs which have been registered on the remark user list, are sent to the PBX 100 (Step 1221).

FIG. 13 is a flowchart for describing the sequence of a user entry process carried out by the terminal equipment 101 free of the IC card control shown in FIG. 5 or the sequence of a user entry process carried out by the user entry control (304 or 503) of the terminal equipment having the IC card control when the user is re-entered in the PBX server system without drawing the IC card after the use of the server by the user is temporarily stopped. In order to enter the user in the system, the user first depresses a keyboard. Then, when a user system entry request is detected (Step 1300), it is determined (in Step 1301) whether or not a terminal in which the user has made an entry is an IC card system, thereby distinguishing the above process. When it is determined to be positive, the user is required to input a user name which has been entered in the system in order to judge whether the re-entry of the same user in the system is made (Step 1302). When the user name is received from the main function 302 (Step 1303), the user name thus received is compared with the user name registered on the IC card (Step 1304). If it is judged that they coincide with each other, then the user sends a server use resumption message to the PBX 100 from the terminal equipment 101 (Step 1305), thus finishing its routine procedure. If it is judged that they do not coincide with each other, then the user who has made his entry procedure receives an entry NG message as being an improper user (Step 1306), thereby terminating its routine procedure. If the answer is determined to be no in Step 1301, then the user who desires an entry procedure is required to input his own user ID and password- (Step 1307). The -user ID and password are received from the user as a response relative to its input request (Step 1308). It is checked (in Step 1309) at this time whether or not the received user ID has been registered on the remark user list which has stored the user ID of the user has falsely been entered in the system (Step 1309). If the answer is determined to be yes, an entry NG message is sent to the user (Step 1306), and its routine procedure terminates. If the answer is determined to be no, the user entry control 503 requires the communication interface 504 to set up a data link for carrying out data communication based on a packet exchange mode between the terminal equipment and the PBX (Step 1310). As a response relative to the data link setup request, a packet link setup message is received (Step 1311) or a user entry negative message is received (1312). When the user entry NG message is received at this time, the user who made a server system entry request is inhibited from using the server, thereby enabling the user to use only the terminal equipment 101 (Step 1313). When the packet link setup message is received in Step 1311, the user entry control 503 sends a user ID and a user password inputted from the user to the communication interface 504 (Step 1314). It is then determined (in Step 1315) whether or not the user has been entered in the PBX 100. If the answer is determined to be yes, and the user can employ the system, then a use complete flag is sent to an OFF condition (Step 1316). In addition, the user entry control 503 sends information about, for example, a server name and a server ID that the user can employ, to the server use control 502 (Step 1317). Then, a communication program corresponding to the server informed of such information from an external storage device of the terminal equipment 101 or the PEX is downloaded (Step 1318). After that, a server user start message is sent to the communication interface 504, thereby enabling data to be transmitted to the server (Step 1319). If the user who has made an entry request, receives a message to the effect that the user has not been registered in the PBX 100 from the communication interface 504 in Step 1315, the user who has tried a system entry procedure is informed of an entry NG message (Step 1320). Then, the number of entry failures is incremented (Step 1321). It is then determined (in Step 1322) whether or not a user ID of the user who failed in its entry has already been entered in the entry failure user ID list. If the answer is determined to be no, then the user ID is entered again in the entry failure user ID list (Step 1323). Then, a time P having a period Tr is started (Step 1324). The timer P is activated for every user IDs. If the entry of the identical user ID in the system does not fail after the period Tr has passed, then it is deleted from the entry failure user ID list. If the user ID has already been entered in the entry failure user ID list, then the timer P corresponding to the user ID is activated again (Step 1324). It is then determined (in Step 1325) whether or not the number of the entry failures has reached a given number of times M. If the answer is determined to be no, then the routine procedure ends. If the answer is determined to be yes, then all the user IDs which have been registered on the entry failure user ID list are entered in a user list requiring special attention, i.e., a remark user list (Step 1326). Then, a timer K having a period Tk is started (Step 1327). The timer K is used to measure or count a period during which the user IDs are held or stored in the remark user list. When the timer K is timed out, a corresponding user ID is deleted from the remark user list. After the starting of the timer K has been made, the user IDs which have been registered on the remark user list, are sent to the VBX 100 (Step 1328). Even if a process for checking the user entry failure is realized by the packet control in the PBX, the same functions as those described above can be achieved.

Figure 14:
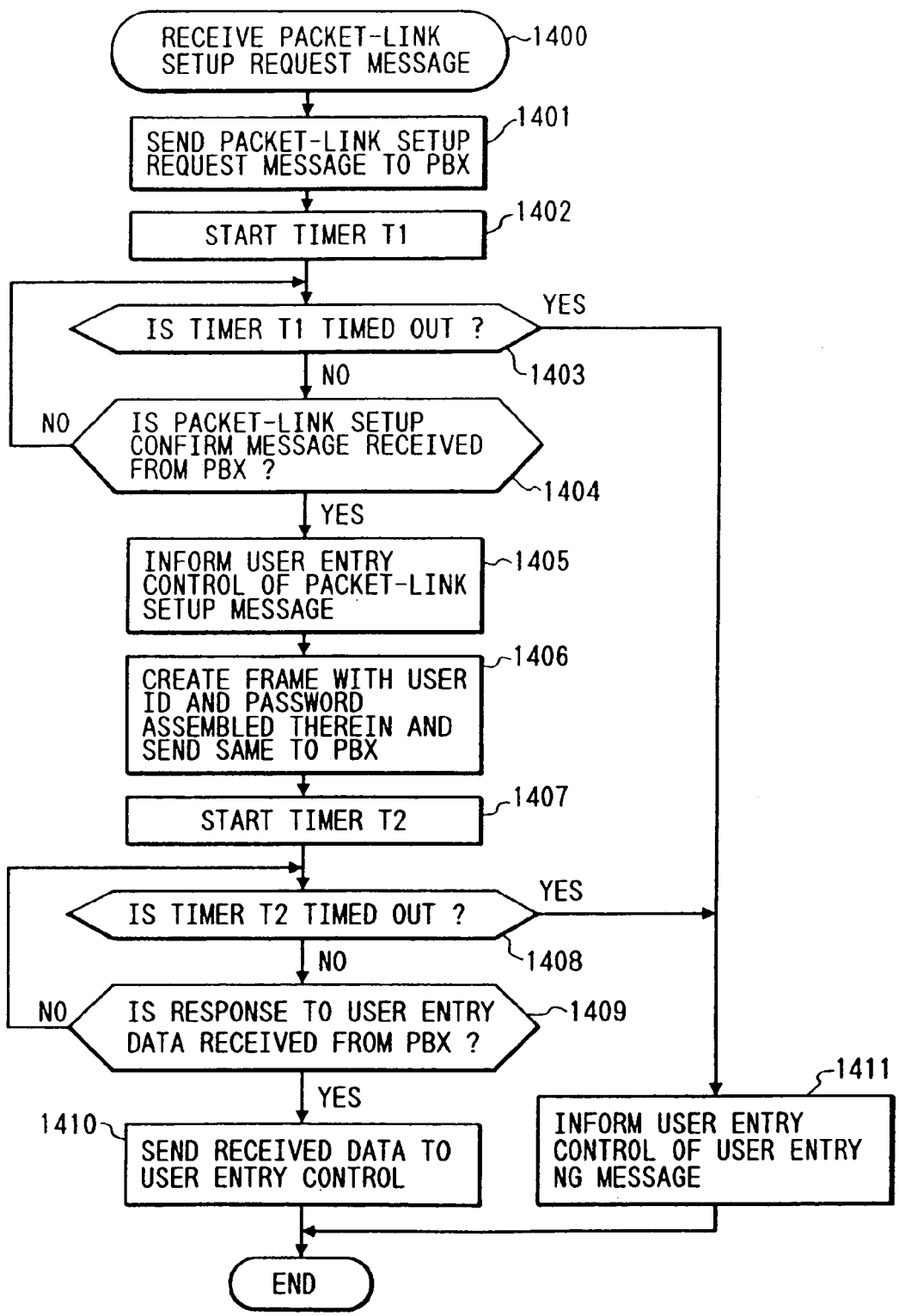
FIG. 14 is a flowchart for describing the sequence of processes carried out by a communication interface of terminal equipment.

FIG. 14 is a flowchart for describing the sequence of processes, which are carried out by the communication interface of the terminal equipment 101, from the reception of a data link setup request message for the data communication based on the packet exchange mode from the user entry control to the response relative to its reception. When a packet link setup request message is received from the user entry control (Step 1400), the communication interface 305 sends the message to the PBX 100 (Step 1401). At this time, a packet link setup wait timer T1 is started (Step 1402). It is then checked (in Step 1403) whether or not the timer T1 has been timed out. If the answer is of no, then it is determined (in Step 1404) whether or not the packet link setup confirm message has been received from the PBX. When the packet link setup confirm message is received from the PBX before the timer T1 is timed out, the user entry control is informed of a packet link setup message (Step 1405). Then, a user ID and a user password are received from the user entry control in response to the packet link setup message, thereby creating a data frame in which the user ID and the password are assembled as user information. Then, the data frame is delivered to the PBX as user information of a connection request packet used to specify a special destination address for the purpose of the use of the server system (Step 1406). Then, a user entry wait timer T2 in the PBX is started (Step 1407). It is checked (in Step 1408) whether or not the timer T2 has been timed out. If the answer is of no, then it is (in Step 1409) determined whether or not a response relative to user entry data has been received from the PBX. When data indicative of a user entry inquiry message is received as user information of a call connected packet from the PBX before the time T2 is timed out, the data indicative of the user entry inquiry message is delivered to the user entry control (Step 1410). Incidentally, an entry complete message indicative of a user entry permit includes a server ID of a server available to the user, a logical channel number used for the data transmission, etc. If the timer T1 is timed out in Step 1403 or if the timer T2 is timed out in Step 1408, or if they are timed out, then a user entry NG message is sent to the user entry control (Step 1411), thus finishing its routine procedure.

Figure 15:
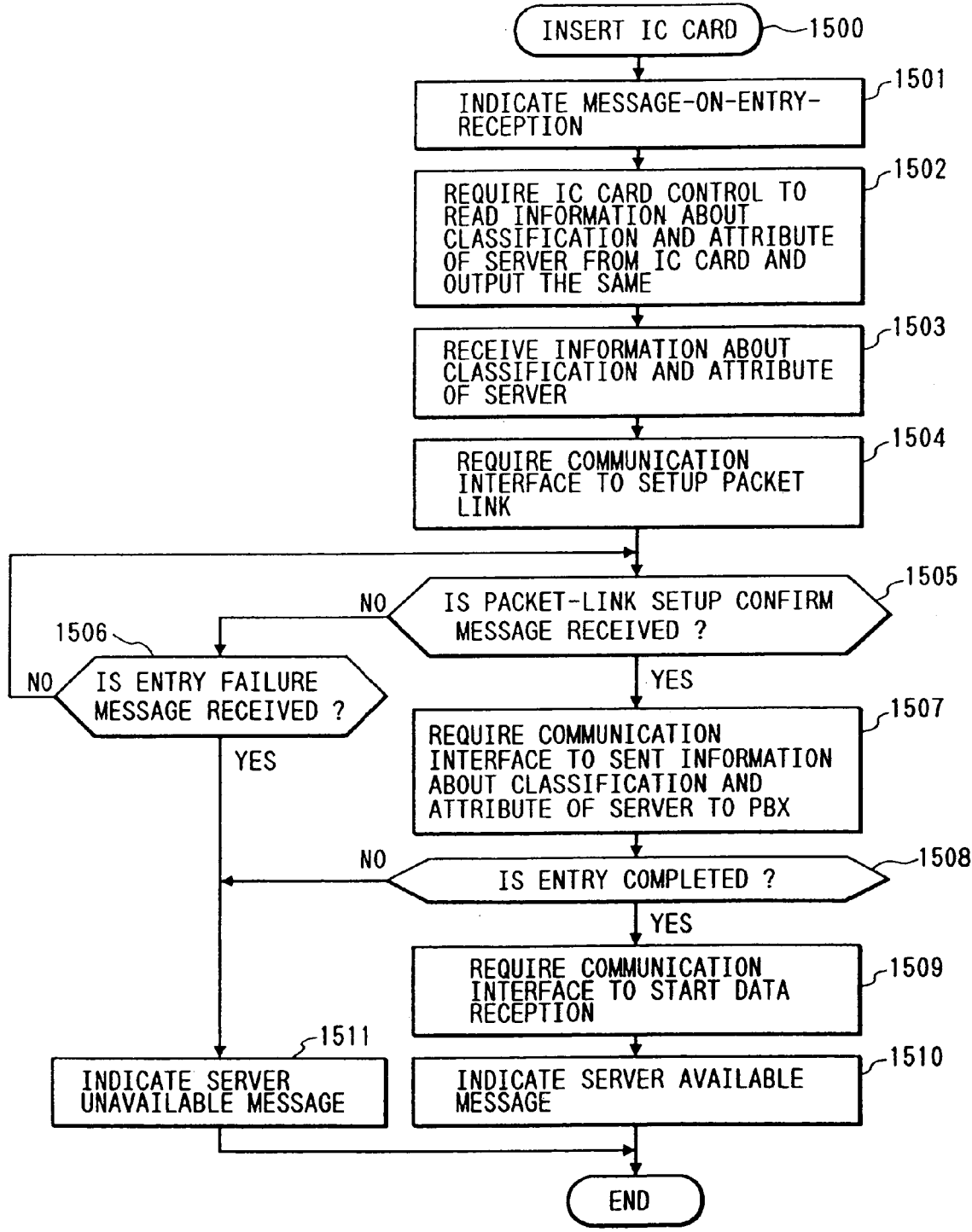
FIG. 15 is a flowchart for describing the sequence of processes made by terminal equipment with an IC card control upon entry of a server in the system.
Figure 16:
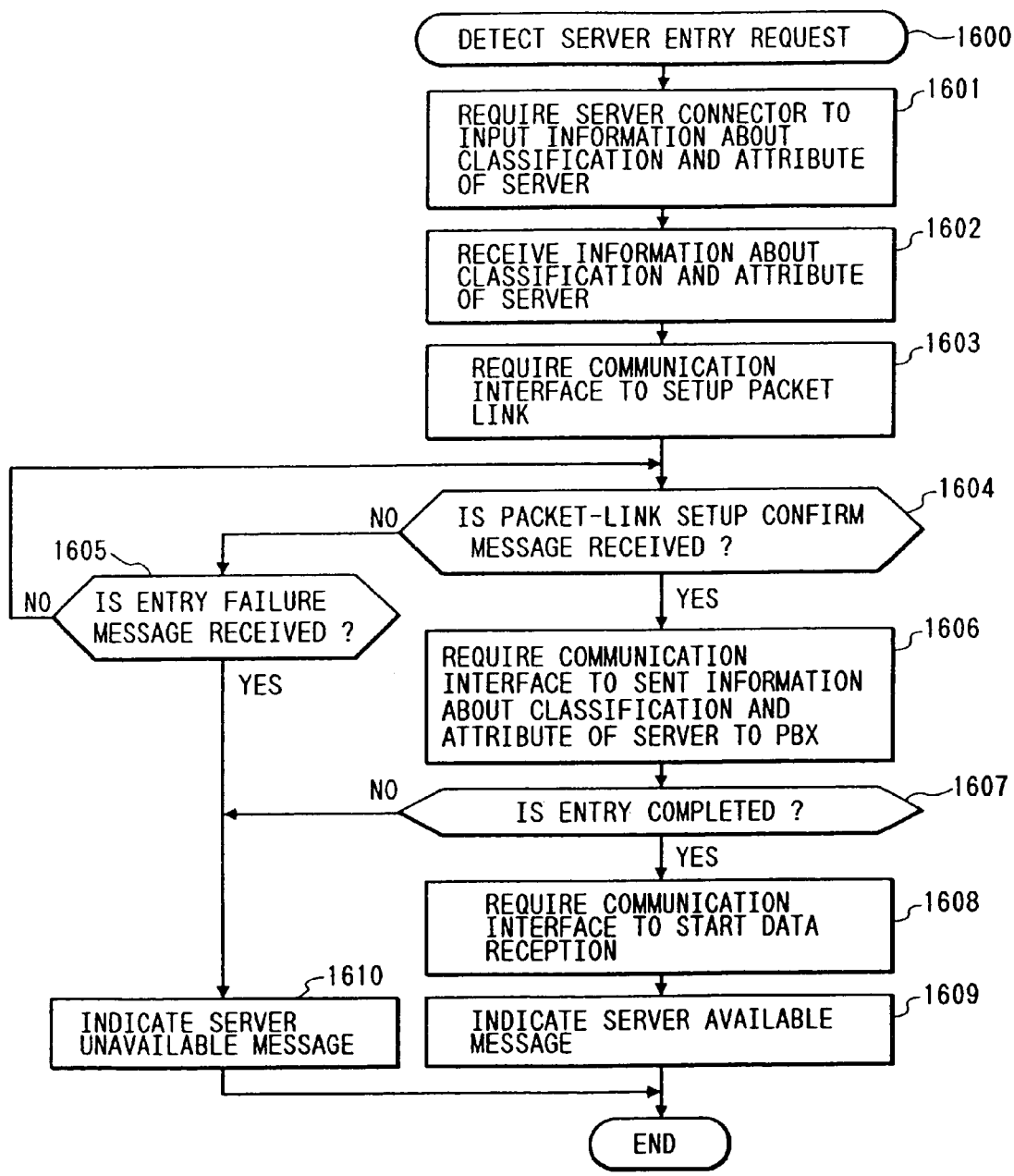
FIG. 16 is a flowchart for describing the sequence of processes carried out by a server free of an IC card control upon its system entry.

FIGS. 15 and 16 are flowcharts for describing the sequence of processes, which are carried out by the server 104 in the PBX server system according to the first embodiment of the present invention, from the detection of a server entry to the state of the server being capable of providing communication services. A description will now be made of the sequence of the processes performed by the server with reference to FIGS. 15 and 16.

FIG. 15 shows the sequence of the processes carried out by a sever entry control 404 of the server 104 upon entry of the server 104 having an IC card control 401 in the system. When a server installer inserts an IC card 408 for a system entry into the server (Step 1500), an IC card control 401 detects its insertion, and then informs a server entry control 404 of the result of its insertion. The server entry control 404 indicates a message showing the state of a server entry being under reception (Step 1501). The server entry control 404 requires the IC card control 401 to read server information such as a server name, a server ID, classification of a server which have been stored in given locations of the IC card, from the IC card and to send the read result thereto- (Step 1502). When the IC card control receives a request for reading the server information from the IC card, the IC card control reads the server information from the IC card and then sends the read result to the server entry control 404. Then, when the server entry control 404 accepts the server information (Step 1503), the -server entry control 404 requires a communication interface 405 to set up or establish a data link for data communication based on a packet exchange mode, which data link being used to carry out data communication for the use of the server between the server and the PBX (Step 1504). Then, the server entry control 404 receives either a packet link setup confirm message or an entry NG message from the communication interface 405 (Step 1506). If the packet link setup confirm message is received from the communication interface 405, then the server entry control 404 requires the communication interface 405 to transmit the server information to the PBX (Step 1507). Then, the communication interface 405 waits for a response from the PBX relative to the transmission of the server information thereto (Step 1508). When the server entry control 404 receives the entry complete message from the communication interface 405, it requires the communication interface 405 to enable the data communication for the use of the server (Step 1509), followed by changing the message on entry reception to a server available message (Step 1510), thereby terminating its process. If the entry NG message is received in Step 1506 or the entry NG message is accepted in Step 1508, then the server judges that it has failed in the system entry procedure, thereby disabling a system use. Accordingly, the server entry control 404 changes the message on-entry-reception to a server unavailable message (Step 1511), thus finishing its routine procedure.

FIG. 16 is a flowchart for describing the sequence of system entry processes carried out by a server entry control 603 of a server free of an IC card control such as that shown in FIG. 6. In order to -enter a server in the system, a server installer first operates a keyboard. Then, when a server's system entry request is detected (Step 1600), the server entry control 603 requires the server installer who has tried to connect the server to the system to input server information such as a server name, a server ID, classification of a server (Step 1601). Then, a user inputs the server information in response to its request. When the server entry control 603 receives the server information (Step 1602), it requires a communication interface 604 to set up a packet link (Step 1603). The subsequent steps are the same as the steps of 1505 to 1511 carried out by the server entry control 404 of the server having the IC card control.

The operation of the inside of the PBX 100 employed in the PBX server system according to the first embodiment of the present invention will now be described below.

Figure 17B:
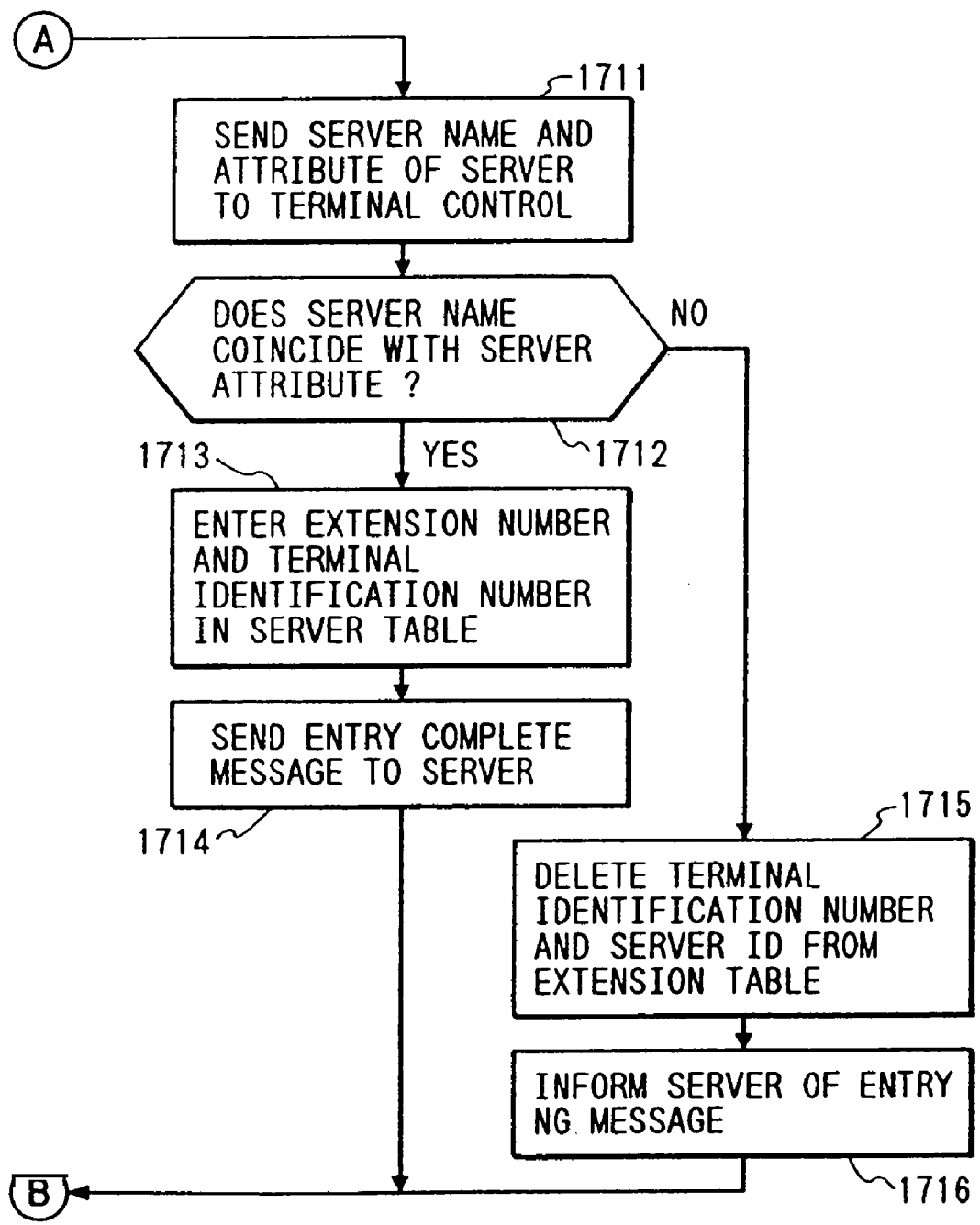
FIG. 17 is a flowchart for describing the sequence of processes carried out by a packet control upon receipt of a packet for control data communication.

FIG. 17 is a flowchart for describing the sequence of processes, which are carried out by the packet control 701 in a packet exchange of the PBX 100, at the time that a packet for control data communication is received. When, for example, a connection request packet to the PBX server system, a clear request packet, and a connection and/or disconnection request packet for control data communication are sent to the PBX from either the terminal equipment 101 in which a user made an entry or the server 104, the packet control 701 of the PBX 100 receives them (Step 1700). A special destination address is assigned to the packet for the control data communication, which is used to employ the server. It is then determined (in Step 1701) whether or not user data of the packet for the control data communication, which packet being used to utilize a received server, is of data for calling for the entry of either the user or the server in the PBX server system. If the answer is determined to be yes, then it is determined (in Step 1702) whether or not the data is used to enter either the user or the server in the system. If it is judged that the data is used to enter the user in the system, then a user ID and a user pass word is taken out from the data so as to be sent to the terminal control 702, where their inquiry requests are made (Step 1703). Then, a terminal identification number of a terminal in which the user has entered, and a user ID are registered on an extension table 800 of an extension number, to which the terminal equipment has been connected. The packet control 701 receives the result of the inquiry of the user ID and the user password at the terminal control 702 (Step 1704). When a user entry permit message is received, a server name available to the user specified based on information included in data indicative of a user entry permit message, and a specific logical channel number used in the server on or through the data link between the PBX and the terminal equipment, are entered in corresponding locations of the extension table 800 (Step 1705). Then, the user ID 905 of the user, and the extension number 906 of the extension connected with the terminal in which the user has made an entry, are registered in associated locations corresponding to a server's empty logical channel number 904 on the server table 900 over all the servers to which users can be connected (Step 1706). In addition, a logical channel number 804 assigned newly in accordance with the use of a server by a user is entered in each server's location of the extension table 800 to which the server is connected, and a user ID of each user is registered in a destination 805 thereof (Step 1707). Then, data having, as elements, information serving as a user entry complete message, about a server ID, a logical channel number, etc. and a user available server are sent to the terminal equipment in which the user has made an entry, as user information of a call connected packet (Step 1708), thus finishing its routine procedure. In step 1704, the terminal control 702 is activated to make an inquiry about the user ID and the user password. As a result, the terminal control 702 judges that an entry request has been made by a user who has not been registered in advance as a system available one. When a message indicative of a rejection of the entry of the user in the system is received, the terminal identification number 802 and the user ID 803 which have been entered in the extension table 800, are deleted (Step 1709). Then, the message indicative of the rejection of the entry of the user in the PBX server system is sent to the terminal equipment in which the user has made an entry, as the user information of the call connected packet (Step 1710), followed by releasing a packet call, thus terminating its routine procedure. If it is judged that the data is used to enter the server 104 in the PBX server system, then a server name, a server ID and a server's attribute is taken out from the data so as to be delivered to the terminal control 702, where their inquiry requests are made (Step 1711). Then, a server's terminal identification number and a server ID are registered on the extension table 800 of an extension number, to which the server has been connected. The terminal control 701 receives the result of the inquiry about the server name, the server ID and the server's attribute (Step 1712). When a server entry permit message is received, an extension number 902 to which the server is connected, and a terminal identification number 903 are registered on the server table 900 (Step 1713). Then, a server entry complete message is sent to the server as the user information of the call connected packet (Step 1714), thus terminating its routine procedure. In step 1712, the terminal control 702 is activated to make an inquiry about the server name, the server ID and the server's attribute. As a result, the terminal control 702 judges that an entry request has been made by a server who has not been registered in advance as a server for providing communication services. When a message indicative of a rejection of the connection of the server to the system is received, the terminal identification number 802 and the server ID 803 which have been entered in the extension table 800, are deleted (Step 1715). Then, the message indicative of the rejection of the entry of the server in the PBX server system is sent to the server (Step 1716), thus finishing its routine procedure. If the answer is determined to be no in Step 1701, then the data is used to complete the connection of the terminal equipment used by the user to the system or to resume its connection. It is therefore judged (in Step 1717) whether the data is used for either the completion of its connection or resumption of its connection. If it is judged that the data shows the completion of its connection, then the user ID 803 is deleted from the extension table 800. In addition, the user ID 905 of destination and the extension number 906 of the user are deleted from the server table 900. Then, a desired logical channel number 904 corresponding to the user ID 905 of destination is read, and a user ID 805 corresponding to the same logical channel number 804 relative to each server's element in an extension table 800 of an extension to which a server has been connected, is deleted (Step 1718). Incidentally, the packet for the control data communication, which is used to transmit the data referred to above, is of a clear request packet. If it is judged in Step 1717 that the data shows the resumption of its connection, then each element of the same terminal identification numbers 802 of the extension table 800 is retrieved, and each user ID of the user who has resumed the connection to the system is registered in each element of the user ID 803, which corresponds to the result of its retrieval. When the user is entered in the system, the entry of the respective contents in the server table 900 and the entry of the contents in the elements corresponding to the respective available servers of the extension table 800 are carried out (Step 1719) in the same procedure as described above, thus terminating its routine procedure.

Figure 18:
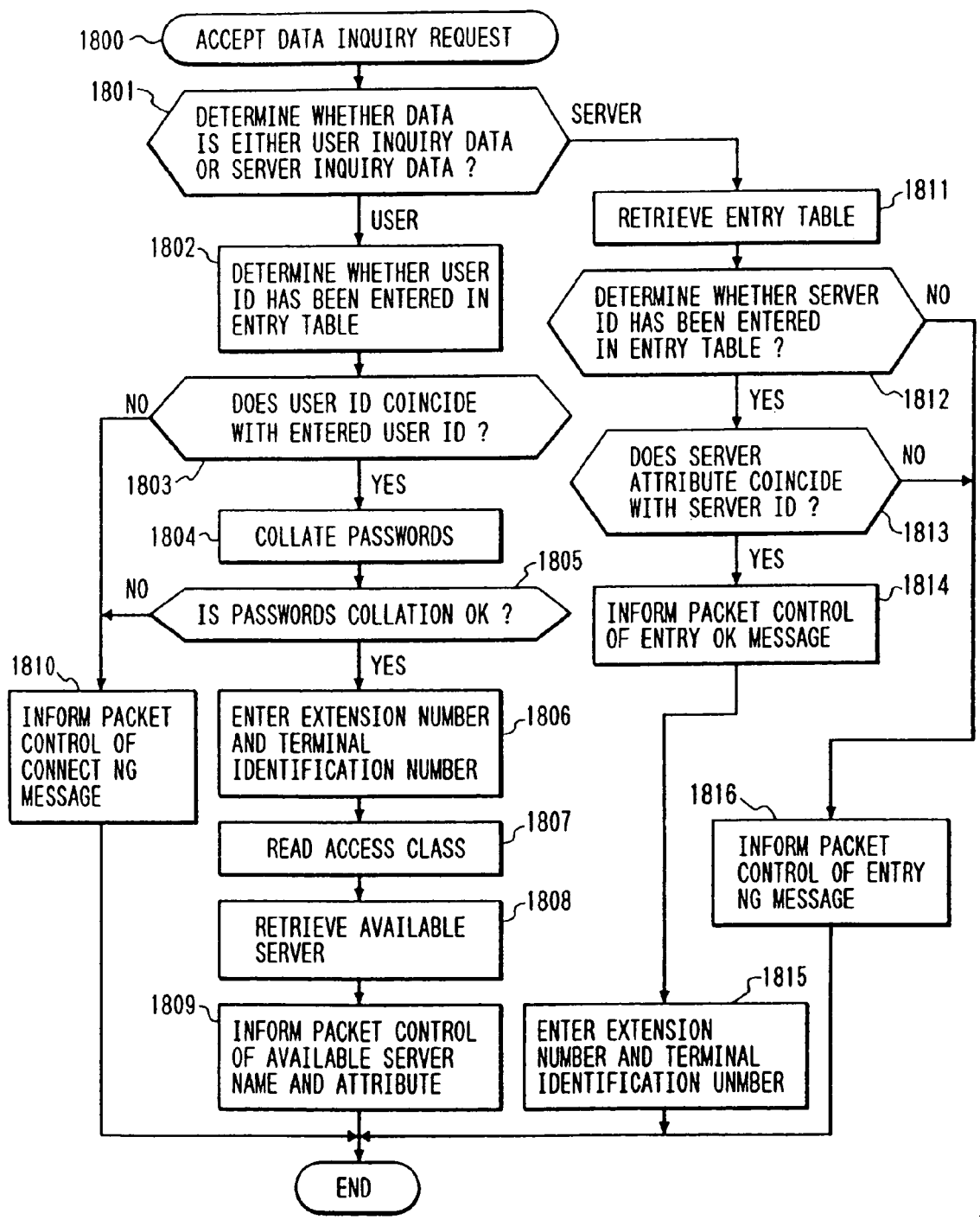
FIG. 18 is a flowchart for describing the sequence of user and server inquiry processes carried out by a terminal control.

FIG. 18 is a flowchart for describing the sequence of inquiry processes about the user and the server, which are carried out by the terminal control 702 in the packet exchange of the PBX 100. More specifically, it is judged whether or not information received at the packet control 701, for entering the entry of either the user or the server in the system can be regarded as appropriate. The terminal control 702 has an entry table 1000, and compares the information which has been registered on the table with the received data.

When the terminal control 702 receives a data inquiry request for the system entry from the packet control 701 (Step 1800), it is determined (in Step 1801) whether data is used to make an inquiry about either the user or the server. If it is determined to be user inquiry data, then it is judged (in Step 1802) whether or not a user ID sent from the user has been entered in a user ID 1001 of the entry table 1000. If the user ID coincident with the user ID received from the user has been registered on the entry table 1000 (Step 1803), then a password received from the user is compared with a password 1003 registered on the entry table 1000 (Step 1804). If the answer is determined to be yes (Step 1805), then connected extension number and terminal identification number of terminal equipment 101 used by the user who made an entry request are entered in respectively corresponding elements of an extension number 1005 and a terminal identification number 1006 of the entry table 1000 (Step 1806). Then, a registered access class 1004 of the user is read from the entry table 1000 (Step 1807). Now, the terminal control 702 has recognized in advance the corresponding relation between the classification of the server and the attribute thereof available in accordance with each access class, and retrieves a user's available server from the access class 1004 (Step 1808). Then, the terminal control 702 sends the user available server's name and its attribute to the packet control 701 (Step 1809). If one identical to the user ID received from the user has not been registered on the entry table 1000 in Step 1803, and if the password from the user does not coincide with the registered password in Step 1805, then the user who made a system entry request is regarded as being an improper user subjected to the rejection of the system use, so that the terminal control 702 sends a connection negative (NG) message to the packet control 701 (Step 1810). If it is judged to be the server inquiry data in Step 1801, then retrieval is made as to whether or not the server ID identical to that received upon server inquiry has been registered on the entry table 1000 is (Step 1811). If the answer is determined to be yes (Step 1812), then a judgment is made as to whether or not the information about the server's attribute coincides with the information registered on the entry table 1000 (Step 1813). If the answer is determined to be yes, then the terminal control 702 informs the packet control 701 of a message indicative of permission for the entry of the server in the system (Step 1814). Then, an extension number and a terminal identification numbers connected with a server are registered on the corresponding extension number 1005 and terminal identification number 1006 of the entry table 1000 (Step 1815). If the server ID identical to that received from the server has not been registered on the entry table 1000 in Step 1812, and if the information about the server's attribute is inconsistent with the information registered on the entry table 1000, then the server who made a system entry request is regarded as being an improper server. As a result, the terminal control 702 sends an entry NG message to the packet control 701 (Step 1816). Thus, the terminal control 702 informs the packet control 701 of the message—indicative of either the permit or rejection of the entry of either the user or the server in the PBX server system as the result of the inquiry about the information subjected to the inquiry request from the packet control 701.

The entry of the server in the system and the entry of the user in the system are completed in accordance with the processes referred to above, thereby starting a server's use. FIG. 19 is a flowchart for describing the sequence of processes carried out by the server use control 303 at the time of the delivery of the server use data. First of all, the classification of each server to be used is received from the main function 302 of the terminal equipment 101. Then, a logical channel number 1101 is retrieved from the received classification of each server by reference to an LCN assignment table 1100 (Step 1902). The server use control 303 sends the retrieved logical channel number to the communication interface 305 (Step 1903). Then, the server use control 303 requires the main function 302 to output server use data therefrom (Step 1904). Thereafter, the server use data received at the server use control 303 is transferred to the communication interface 305. On the other hand, a packet with a header added with the sent logical channel number is created as shown in FIG. 33(b), after which the communication interface 305 sends the server use data to a PBX 2800 in the form of the packet.

A description will now be made of processes, which are carried out by the packet control 701, from the reception of data for a server's use with the PBX from terminal equipment employed by a user who has been entered in the PBX server system to the delivery of the received data to a corresponding server with reference to FIGS. 20, 21 and 22.

Figure 20:
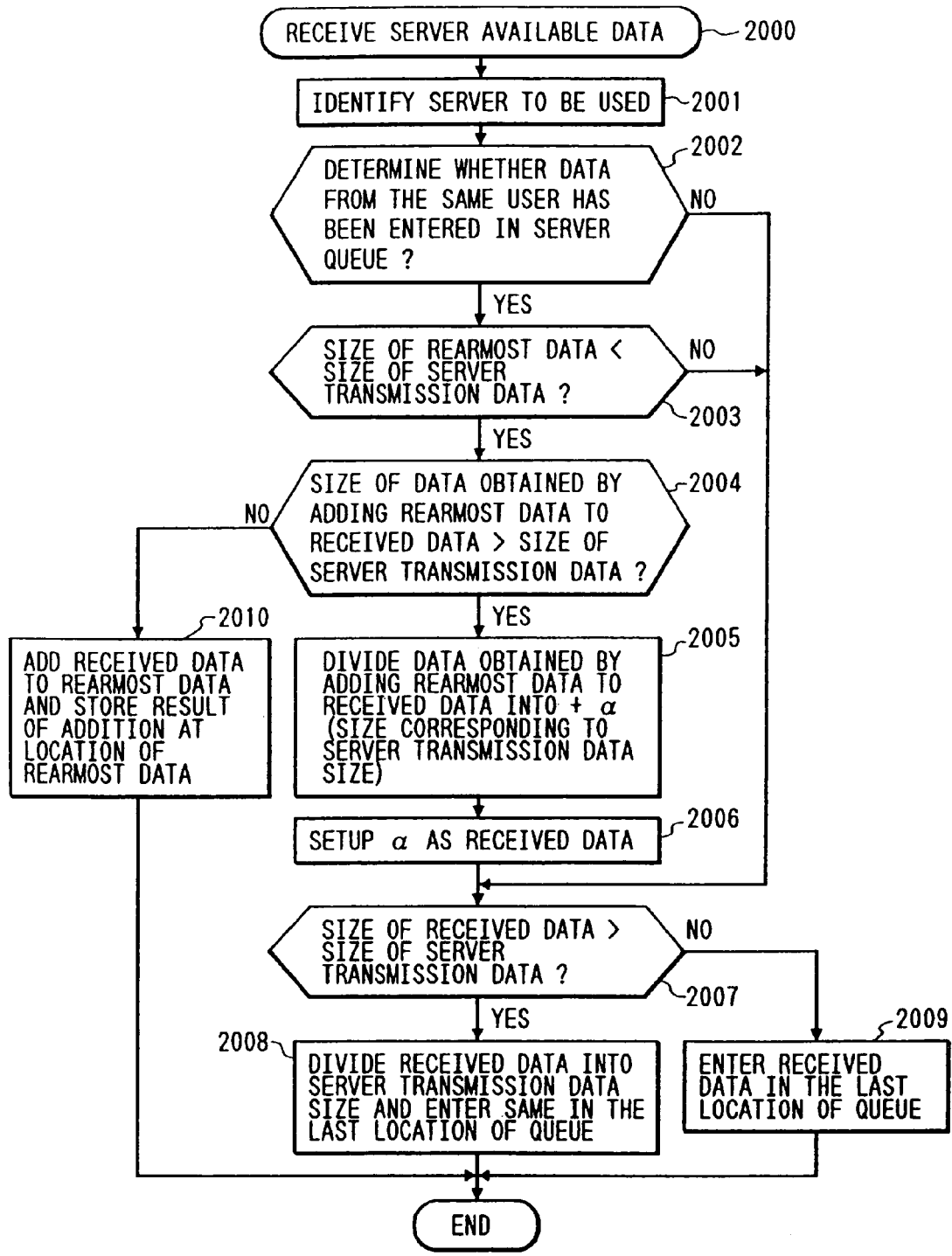
FIG. 20 is a flowchart for describing the sequence of processes from the reception of server use data to the entry of data in a server queue, which are carried out by the packet control.

FIG. 20 is a flowchart for describing the sequence of processes, which are carried out by the packet control 701, from the reception of the server use data to the entry of data in a server queue provided for each server. When the packet control 701 first receives the server use data from the user (Step 2000), it identifies a server to which the user made a use request (Step 2001). This identification can be determined by examining a logical channel number on a data link between the terminal equipment 101 in which the user has made an entry and the PBX, which number being used when the user transmits the server use data to the VBX 100.

Then, data to be sent to the server are entered in a server queue 2100 (see FIG. 21) provided for each server. At this time, it is checked (in Step 2002) whether or not data from the user identical to the registered user has already been entered in the server queue 2100. This checking process is based on the following purpose. Namely, when the information is sent to the server 104 from the PBX 100, a server's process is carried out in a most-efficiently processible data size, thereby making it possible to carry out a data combination and a data separation between continuous two data. When the data from the identical user has been entered in the server queue 2100, a comparison is made between the size of the data received from the identical user, which is placed in the rearmost location of the server queue 2100 assigned by the user and the size of the data capable of most efficiently carrying out the server's process (Step 2003). According to the server queue shown in FIG. 21, when data is sent from a user of a user ID as 0044 to a server n in an illustrated state, a comparison is made between the size of data 2104 entered as a second data as viewed in a server queue 2100-n and the size of the data capable of most efficiently performing the server's process. If the size of the rearmost data in the server queue is smaller than that of the most-efficiently processible data referred to above, then a comparison is made between the size of data obtained by adding the rearmost data in the server queue and the data received from the user and the size of the data capable of most efficiently carrying out the server's process (Step 2004). If the size of the thus added data is larger than that of the latter, then the data thus added is divided into a desired data size substantially equivalent to the size of the data capable of most efficiently carrying out the server's process. After that, each data thus divided is re-registered in the location at which the rearmost data of the server queue 2100 has been entered (Step 2005). Then, each data of the desired data size substantially equivalent to the data size of the data capable of most efficiently carrying out the server's process is separated from the added data, and the remaining each data is subsequently processed as new received data (Step 2006). Then, a comparison is made between the size of the received data referred to above and the size of the data capable of most efficiently carrying out the server's process (Step 200). If the size of the received data is larger than that referred to above in Step 2007, then the received data is divided into the size of the data capable of most efficiently carrying out the server's process, after which each data is entered in the server queue in data order (Step 2008). If it is judged in Step 2002 that the data from the identical user has not been registered in the server queue, and if the size of the data capable of most efficiently performing the server' process is larger than that of the received data referred to above in Step 2003, then the same process as described above is carried out. If the size of the data capable of most efficiently performing the server's process is larger than that of the received data in Step 2007, then the received data from the user is entered in the last location of a server queue to which the user made a use request (Step 2009). If the size of the data capable of most efficiently performing the server's process is larger than that of the added data in Step 2004, then the received data is added to data, which has been entered in the rearmost location, of the data from the identical user which has been entered in the server queue 2100, thereby setting up the thus processed data as new data which is to be entered in the rearmost location. According to the server queue shown in FIG. 21, when the user of the user ID as 0044 sends data for using the server n to the VBX 100 so as to be received thereat, if the size of data obtained by adding the received data to the rearmost data 2104 of the data sent from the user of the user ID as 0044 which has been registered in a server queue 2100-n is smaller than the size of the data capable of most efficiently carrying out the server's process, data obtained by combining the received data and the data 2104 of the server queue 2100-n is reentered in the location at which the data 2104 is disposed.

Figure 22:
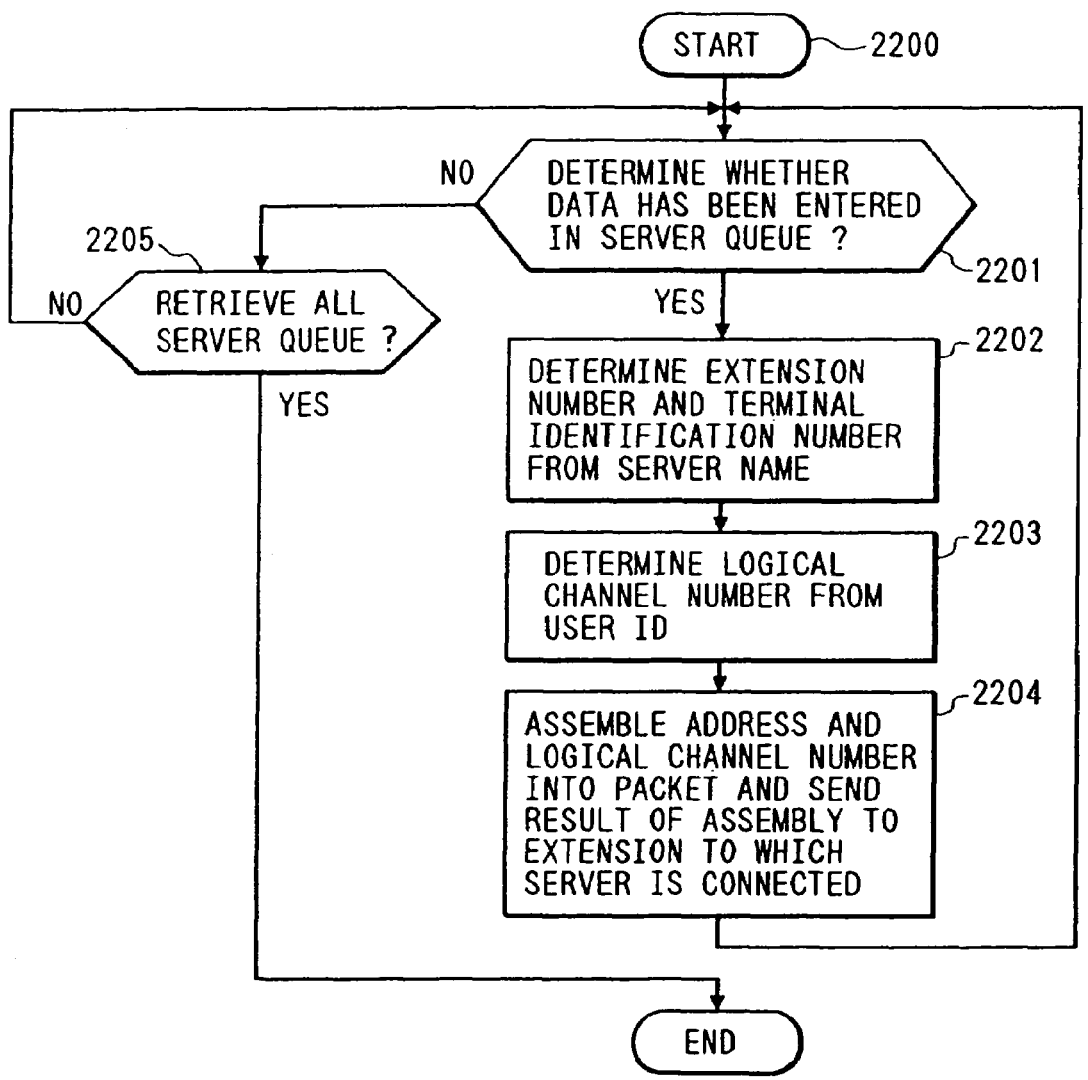
FIG. 22 is a flowchart for describing the sequence of processes carried out by the packet control, for delivering data entered in the server queue to individual servers.

FIG. 22 is a flowchart for describing the sequence of processes, which are carried out by the packet control 701, for delivering data entered in a server queue to a server. When a server's process is started (Step 2200), a judgment is made as to whether or not data has been entered in the server queue 2000 (Step 2201). If the answer is of yes, the packet control 701 retrieves the server table 900 by reference to a server name, thereby determining an extension number required to transmit the data to the server and physical addresses of the server such as a terminal identification number, etc. (Step 2202). Then, the server table 900 is retrieved by reference to the user ID 905 so as to determine a logical channel number necessary upon delivery of data onto a data link between the server and the PBX (Step 2203). Thereafter, the physical addresses and the logical channel number information are added as a header to a data packet taken out from the server queue, after which the so-processed information is sent to an extension to which an intended server has been connected (Step 2204) Then, the routine procedure returns to a process for examining whether or not the data has further been entered in the same server queue. If it is judged that the data is no longer entered in the server queue, then the next server queue retrieval is initiated. When the retrieval of all the server queues is made (Step 2205), the routine procedure ends.

A description will now be made of processes for the separation of the user from the PBX server system and for the completion of the use of the user with respect- to the system with reference to FIGS. 23, 24 and 25.

Figure 23:
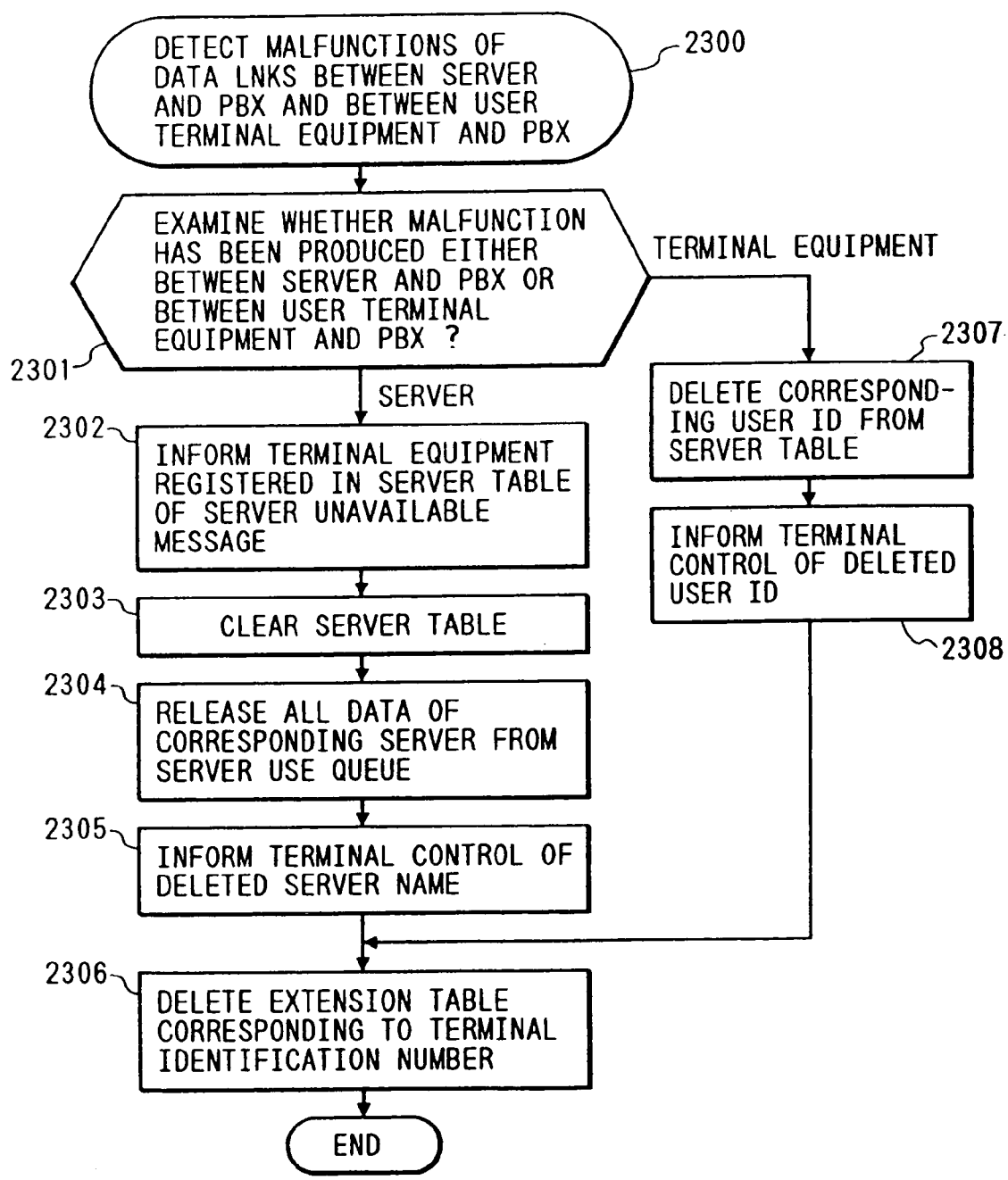
FIG. 23 is a flowchart for describing the sequence of processes carried out by the packet control when faults or malfunctions occur in a data link between a server and a PBX or between terminal equipment and the PBX.

FIG. 23 is a flowchart for describing the sequence of processes carried out by the packet control when faults or malfunctions occur in the data link between the server and the PBX or between the terminal equipment and the PBX. When the terminal equipment in which either the server or the user has made an entry is separated from the extension 105 in a state in which the data link is being set up between either the server or the terminal equipment and the PBX, the packet control 701 detects that the malfunctions have occurred in the data link between either the server or the terminal equipment and the PBX (Step 2300). It is then checked (in Step 2301) whether such malfunctions have been developed in the data link-between the server and the PBX or between the terminal equipment and the PBX. If it is judged that the malfunctions have been developed in the data link between the server and the PBX, then a server unavailable message is sent to the terminal equipment in which the user entered in the server table 900 of the server has made an entry (Step 2302). After the unavailable message has been sent to all the users of the server, corresponding servers of the server table 900 are cleared (Step 2303). Then, all the data entered in the server queue of the server which has been subjected to the malfunctions referred to above, are released (Step 2304). Thereafter, the packet control 701 informs the terminal control 702 of a server name deleted from the server table 900 (Step 2305), and structural elements corresponding to the server which caused the malfunctions to occur in the data link are deleted from the extension table 800 (Step 2306). When the malfunctions which have occurred in the data link are ascribed to the terminal equipment in which the user has made an entry, a user available server's name is retrieved from a corresponding portion of the extension table 800. Then, respective items corresponding to the user Jn the server table 900 of the retrieved server's name are deleted (Step 2307). Then, the packet control 701 sends to the terminal control 702, the user ID of the user which has made an entry into the terminal equipment which caused the malfunctions to occur in the data link between the PBX and the terminal equipment (Step 2308), thereby deleting structural elements corresponding to the terminal equipment from the extension table (Step 2306).

Figure 24:
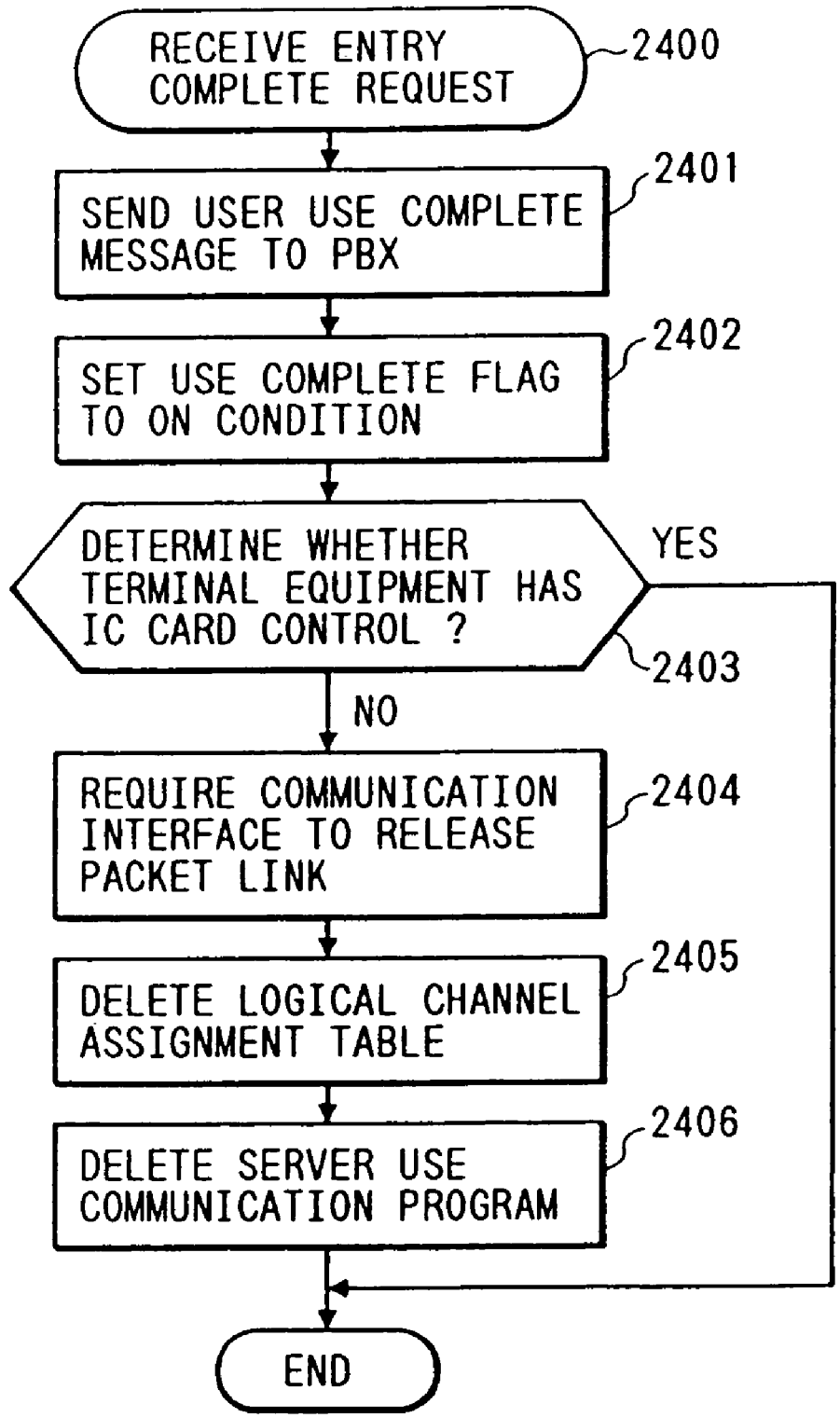
FIG. 24 is a flowchart for describing the sequence of processes for completion of the entry of a user in terminal equipment.
Figure 25:
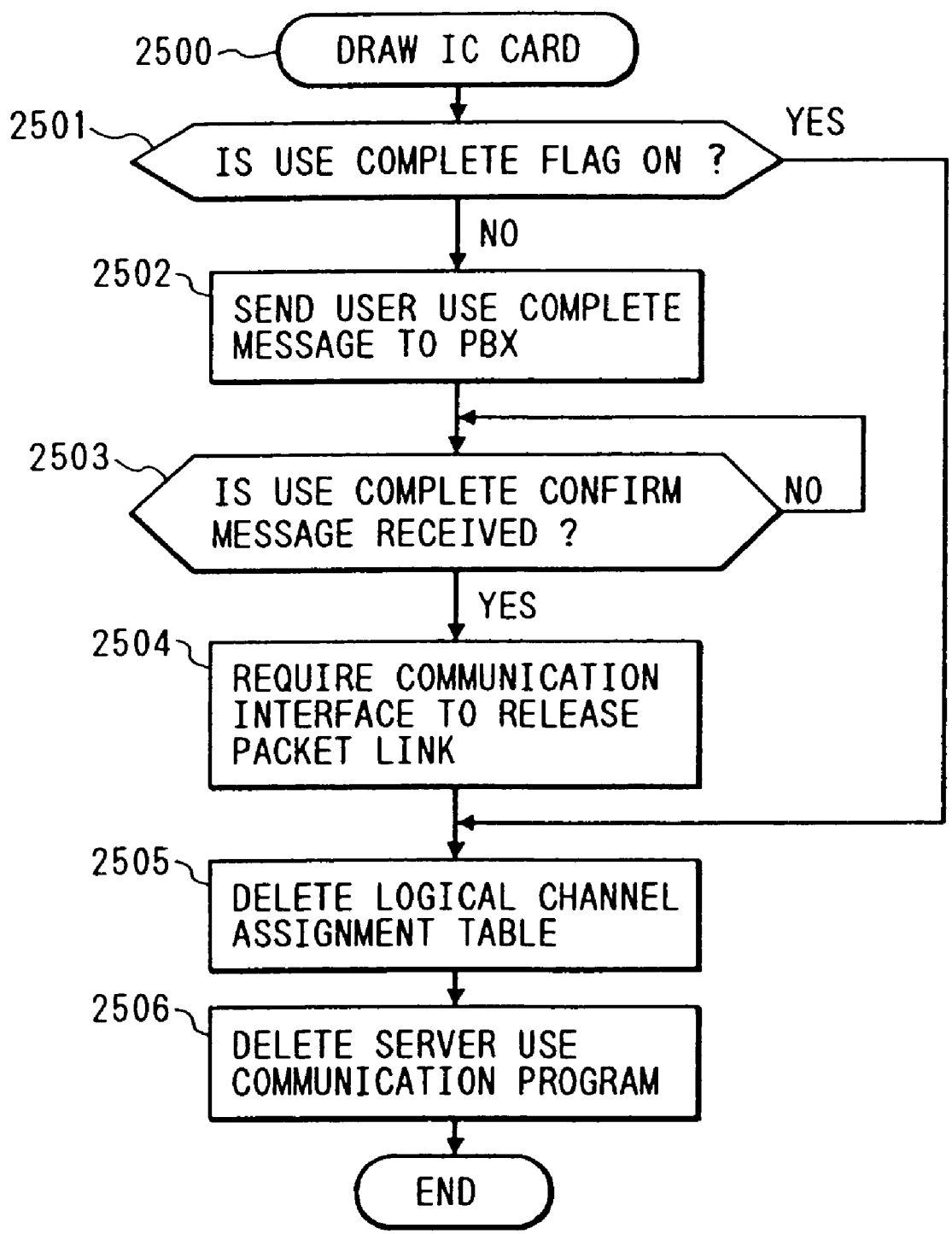
FIG. 25 is a flowchart for describing the sequence of processes carried out by terminal equipment having an IC card control, for completing the entry of a user in the PBX server system.

FIGS. 24 and 25 are flowcharts for describing the sequence of processes for completing the entry of the user in the terminal equipment. FIG. 24 is a flowchart for describing the sequence of processes for completing the entry of the user in the terminal equipment free of the IC card control, shown in FIG. 5 by way of example, which is employed in the system of the present invention, and the sequence of processes for temporarily discontinuing the use of the PBX server system by the user at the terminal equipment having the IC card control, which is employed in the system of the present invention as shown in FIG. 3 by way of example. A message indicative of a request for the completion of the entry of the user in the PBX server system is first received in response to the operation of the terminal equipment by the user (Step 2400). When the message is received, data for informing the PBX of a message indicative of the completion of the use of the PBX server system by the user is created, followed by delivery of the same to the PBX (Step 2401). Then, a use complete flag indicative of the fact that the user does not use the PBX server system is set to an ON condition (Step 2402). It is thereafter judged (in Step 2403) whether or not the terminal equipment includes the IC card control. If the answer is determined to be yes, then the routine procedure ends. If the answer is determined to be no, then the user entry control requires the communication interface 504 to release the data link for carrying out the data communication based on the packet exchange mode between the terminal equipment and the PBX provided that the entry of the user in the PBX server system is terminated. (Step 2404). Correspondingly, the communication interface 504 sends a call control packet for making a packet link release request to the PBX. After the packet link release has been made, an LCN assignment table 1100 is deleted (Step 2405) and communication programs for the use of the Server are all erased (Step 2406).

FIG. 25 is a flowchart for describing the sequence of processes for completing the entry of the user in the PBX server system at the terminal equipment with the IC-card control, shown in FIG. 3 by way of example, which is employed in the system of the present invention. First of all, the IC card control 301 detects that the user has drawn the IC card 306, and informs the user entry control 304 of the result of its detection (Step 2500). In doing so, the user entry control 304 examines whether or not the use complete flag is an ON condition (Step 2501). If the answer is determined to be no, then the user entry control 304 sends a message indicative of the completion of the use of the PBX server system by the user to the PBX (Step 2502). Then, the user entry control 304 waits for a use complete confirm message from the PBX (Step 2503). When the use complete confirm message is received from the PBX, the user entry control 304 requires the communication interface 305 to release the packet link between the terminal equipment and the PBX (Step 2504). Then, an LCN assignment table 1100 is deleted after the packet link has been released (Step 2505), and the communication programs for the use of the server are all deleted (Step 2506).

A description will now be made of the sequence of processes for the use of the PBX server system through a public line with reference to each of FIGS. 26, 27 and 28.

Figure 26:
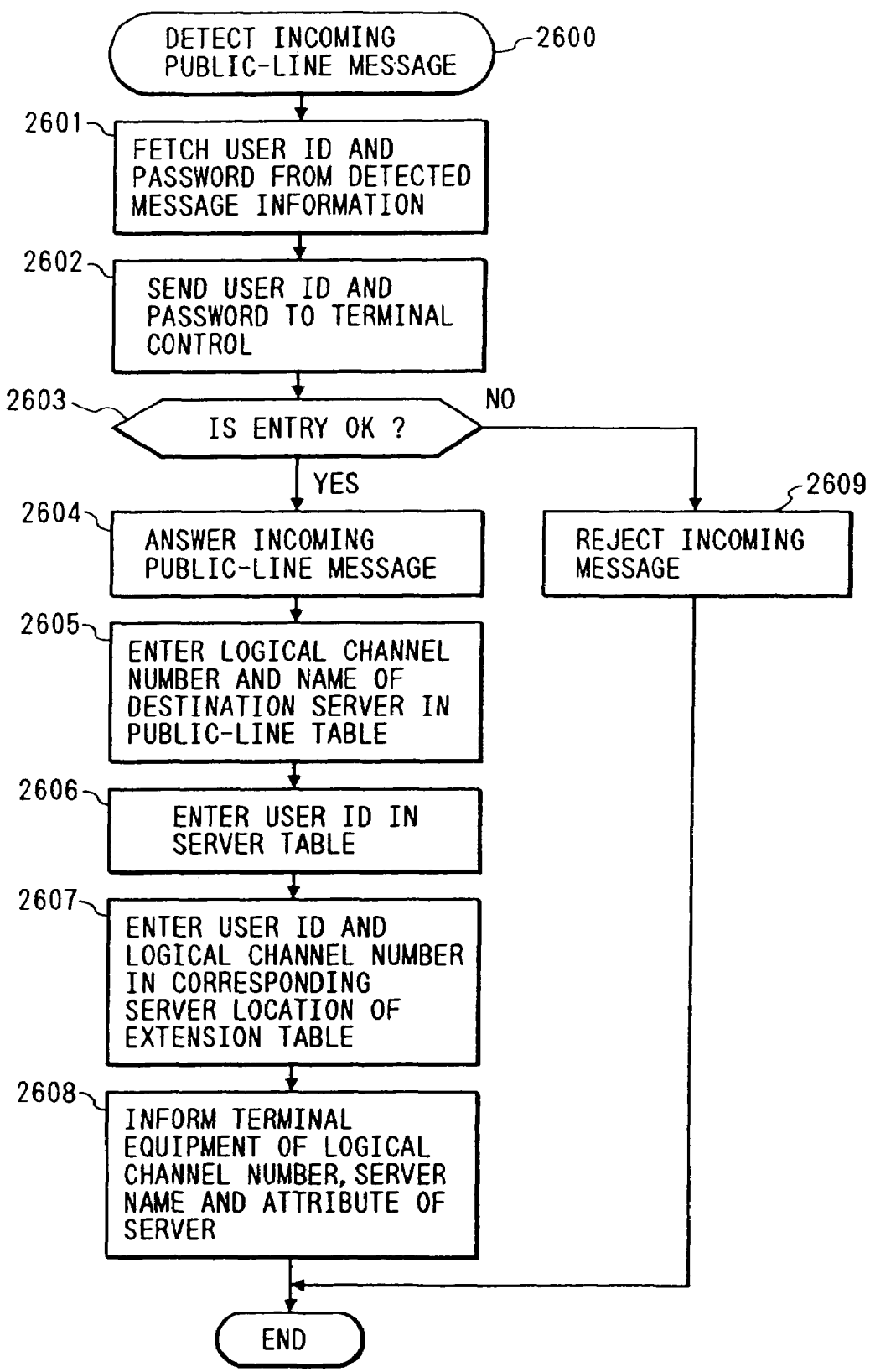
FIG. 26 is a flowchart for describing the sequence of processes carried out by the packet control, for utilizing the server system through a public line.

FIG. 26 is a flowchart for describing the sequence of processes executed by the packet control 701, for making a system use request to the PBX 100 of the PBX server system through a public line 106. When a packet call is first sent to the public line control 206 from external terminal equipment, and information indicative of an incoming message to be delivered to the packet exchange 201 is inputted as additive information of a connection request packet at the time of the reception of the packet call, the incoming message is delivered to the packet control 701. When the public line 106 is used as an ISDN line, server address information and user data are employed as the additive information of the connection request packet. When the packet control 701 detects the message sent thereto through the public line (Step 2600), the packet control 701 fetches a user ID and a user password from the incoming additive information (Step 2601), and then sends the fetched information to the terminal control 702 (Step 2602). Then, the terminal control 702 compares the user ID and the password with those registered. If it is judged (in Step 2603) that the incoming message has been sent from a user permitted to provide access to the PBX server system, then the terminal control 702 sends a response to the incoming message to the public line control. 206 (Step 2604). Then, a public line number 2701, a user ID 2702, a logical channel number 2703 and a server's classification 2704 of the user allowed to be connected to a public line table 2700, are registered on the public line table 2700 shown in FIG. 27 (Step 2605). Then, a user ID 905 and a user's public line number are registered on a server table 900 (Step 2606). In order to distinguish between the extension and the public line, an identifier (e.g., "T") indicative of the public line number is applied to the head of the number. Then, a logical channel number 804 utilized by the user connected via the public line to the PBX server system is entered in a corresponding element of an extension table 800 (Step 2607). A logical channel number for the use of the server and a server's name and attribute corresponding to the logical channel number are sent to the terminal equipment which has been utilized by the user, which is connected via the public line to the system (Step 2608). If the user is not allowed to gain access to the PBX server system from the result of the comparison between the data referred to above and those registered in Step 2603, the terminal control 702 sends a rejection response to the incoming message to the public line control 206 (Step 2609).

Figures 27, 28:
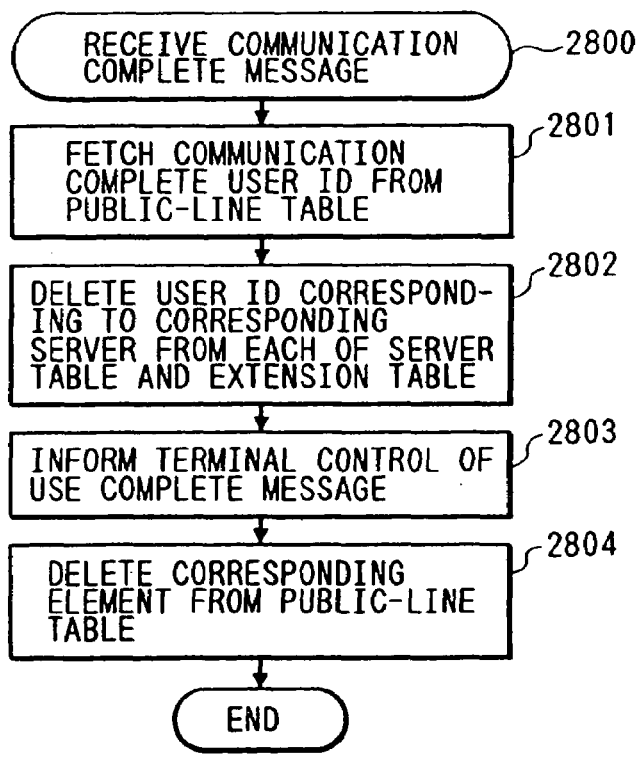
FIG. 27 is a diagram for describing a public-line table.
FIG. 28 is a flowchart for describing the sequence of processes carried out by the packet control at the time a user which has used the system through the public line, has finished using the same.

FIG. 28 is a flowchart for describing the sequence of processes for completing the use of the PBX server system by the user who has employed the PBX server system through the public line 106 and for finishing user's data communication. When a communication complete message of the user is who has utilized the PBX server system through the public line, is received from the public line control 206 (Step 2800), a user ID 2702 subjected to user's communication completion is taken out from the public line table 2700 (Step 2801). Then, a user ID 905 and a user's public line number 906 corresponding to the user ID 905 are deleted from a server table 900 of a server that the user could utilize, and a portion which is equivalent to each corresponding server's element on an extension table 800 and which corresponds to a user ID is deleted (Step 2802). After a user use complete message has been sent to the terminal control 702 (Step 2803), corresponding elements on the public line table 2700 are deleted (Step 2804).

As described above, the present embodiment can bring about the following advantageous effects. A server using an extension of a PBX can be utilized, and terminal equipment and a server can be used in such a manner that they can freely travel over a PBX server system. Since a plurality of pieces of terminal equipment can simultaneously use the same server, they are not placed on a waiting queue when server's use requests compete with each other, with the result that the server can reliably be used. According to another effect of the present embodiment as well, a server's name is designated without specifying a physical address of a server, followed by sending data from a user. Therefore, the user can be connected to a desired server without taking into consideration a location at which the server is connected. According to a further effect of the present invention, a server use permit message is given only to a user which has been entered in advance, thereby making it possible to prevent an improper user from entering into the system. According to a still further effect of the present invention, it is possible to detect that the entry of the improper user in the system has been made through a predetermined number of times or more by the same terminal equipment, thereby making it possible to separate the terminal equipment from the system. Therefore, a user who attempts to enter into the system cannot successively use the same terminal equipment. According to a still further effect of the present invention, an information access class of a user is registered in advance, and ~ user available server is sent correspondingly. In addition, a communication means between the user and a user unavailable server is not completely placed in use. It is therefore possible to connect each server having a variety of security levels to a server system.

A description will now be made of a PBX server system according to a second embodiment of the present invention with reference to the accompanying drawings.

Figure 29:
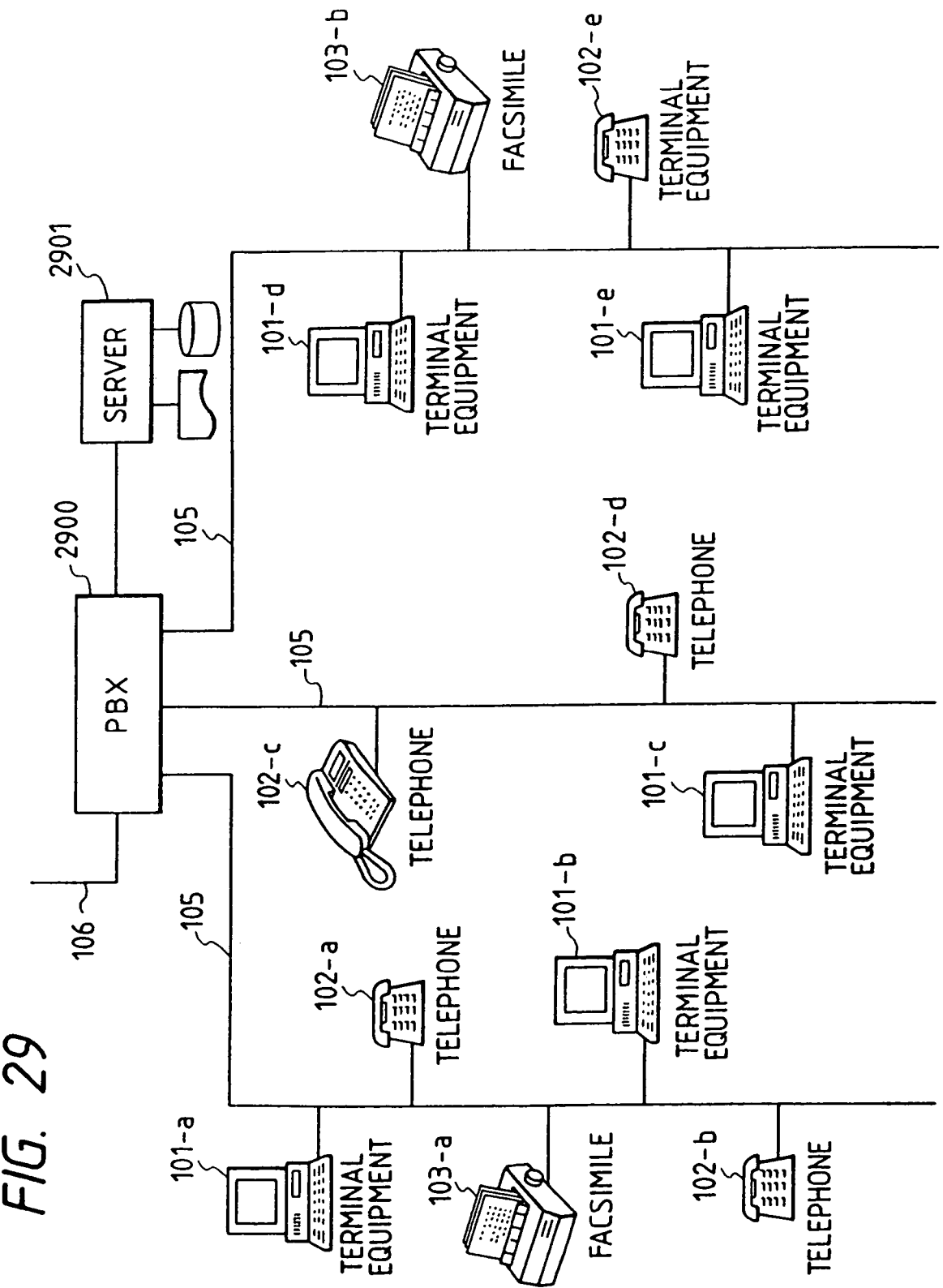
FIG. 29 is a diagram illustrating a PBX server system according to a second embodiment of the present invention.

FIG. 29 shows a PBX server system according to the second embodiment of the present invention. The PBX server system comprises a PBX 2900, a server 2901 connected directly to the PBX 2900, telephones 102 electrically connected to extensions 105, and a plurality of pieces of terminal equipment 101. The present PBX server system differs from the PBX server system shown in FIG. 1 in that the server 2901 is directly connected to the PBX 2900.

Figure 30A:
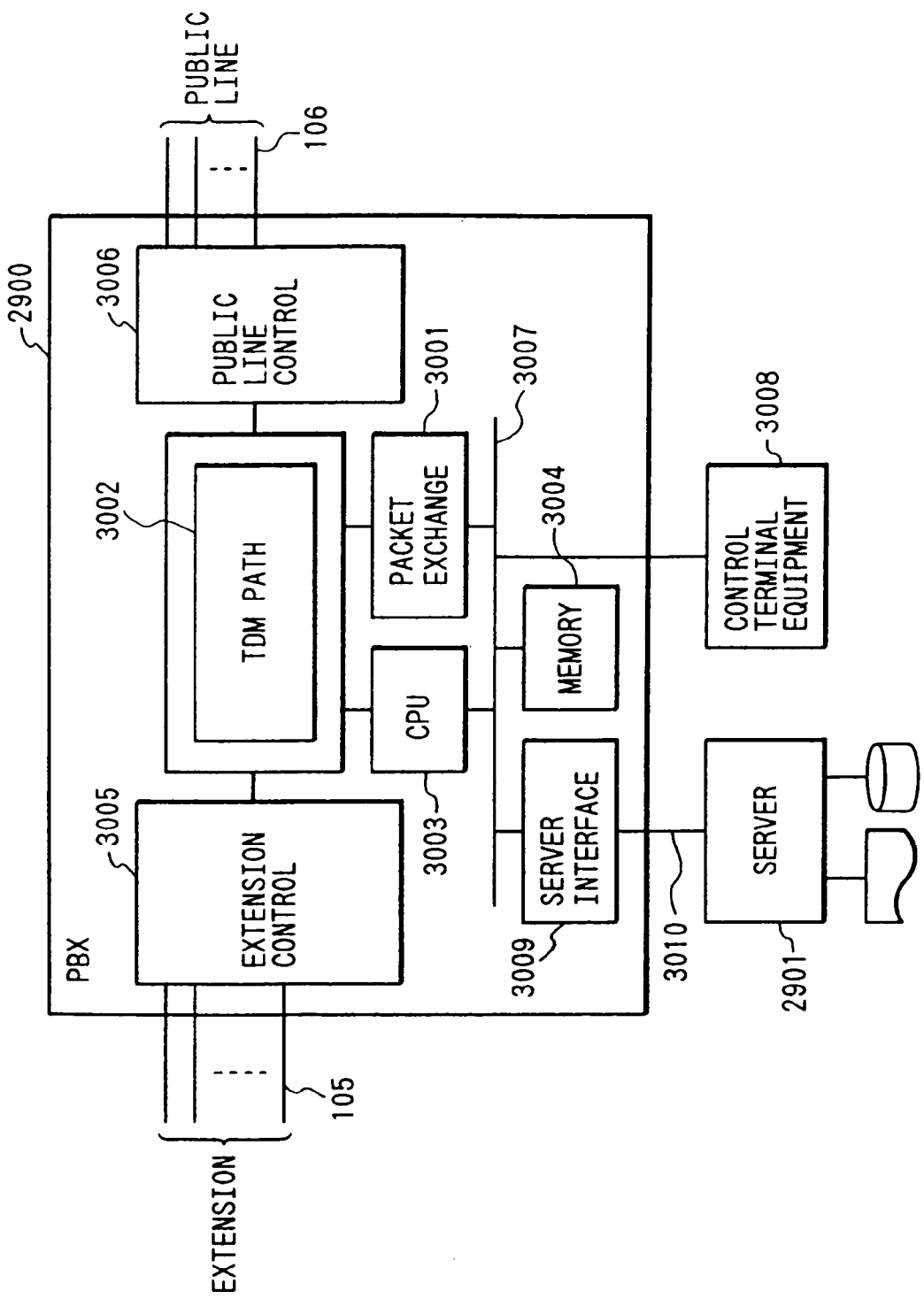
FIG. 30 is a diagram schematically showing the structure of the inside of a PBX employed in the system shown in FIG. 29.
Figure 30B:
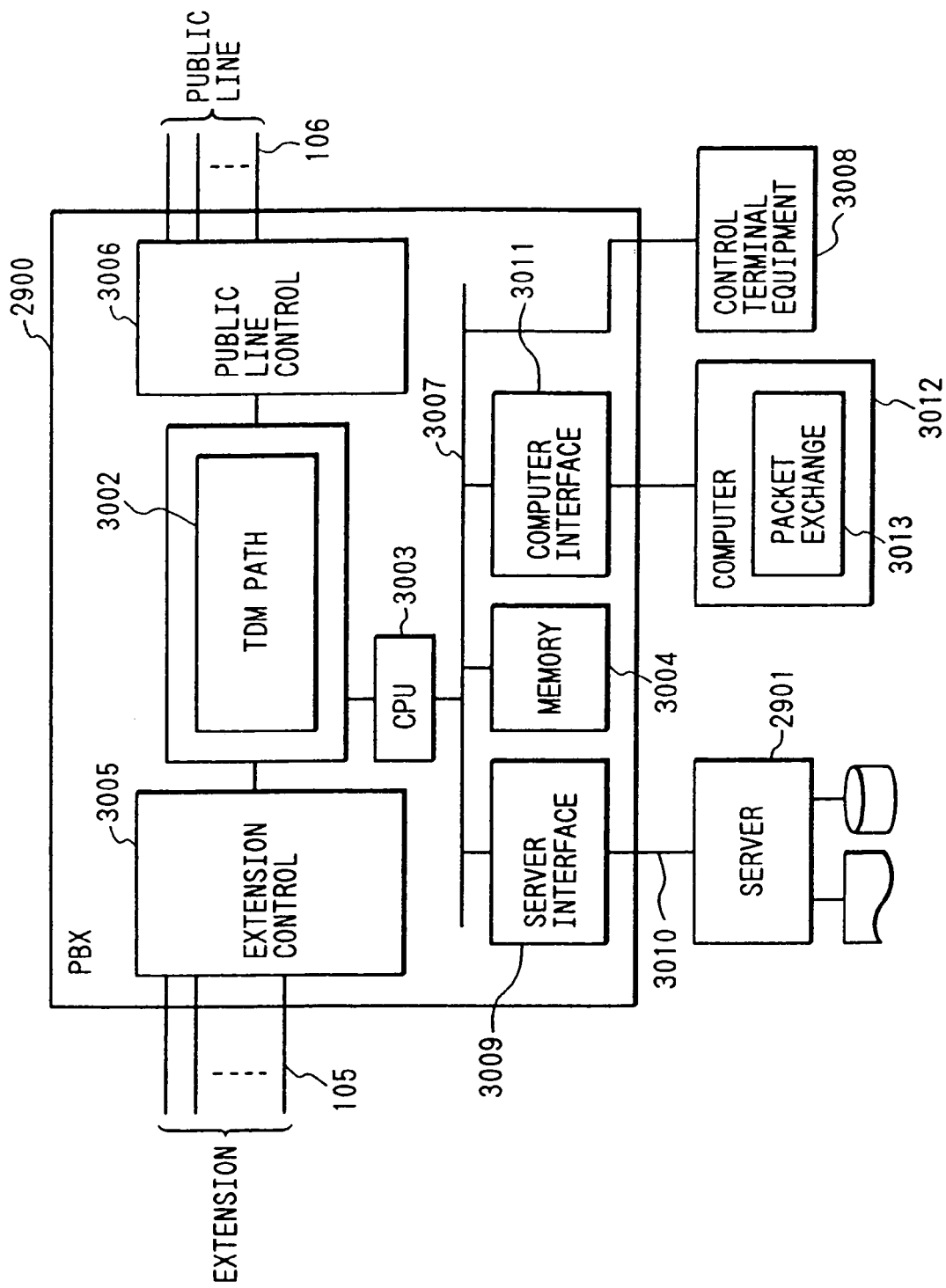

FIG. 30 is a diagram schematically showing the structure of the inside of the PBX 2900. FIG. 30(a) shows the structure of the PBX in which a packet exchange 3001 for exchanging packet data between terminal equipment and each server is directly connected to a time-division multiplex (TDM) path 3202 in the PBX 2900. Also connected to the TDM path 3202 are a CPU 3003 for controlling the entire operation of the PBX 2900, an extension control 3005 for controlling the electrical connections among extensions 105, and a public line control 3006 for controlling the electrical connections among public lines 106. A memory 3004 and a server interface 3009 for controlling the electrical connection between control terminal equipment 3008 and the server 2901 are electrically connected to the CPU 3003. The server interface 3009 also controls the transmission of data through a server connection cable 3010. FIG. 30(*b*) illustrates the structure of another PBX in which a computer 3012 is electrically connected to a CPU 3003 of a PBX 2900 through a computer interface 3011 with the computer 3012 having in its inside a packet exchange 3013. Other elements of structure are identical to those shown in FIG. 30(*a*). According to the structure of FIG. 30(*a*), the extension control 3005 first receives packet data supplied from one of a plurality of pieces of terminal equipment electrically connected to the extensions 105. Then, the packet data thus received passes through the TDM path 3002, after which it is delivered to the packet exchange 3001. Thereafter, the packet data passes through the TDM path 3002 again, and is sent via the CPU 3003 and the CPU bus 3007 to the server interface 3009 as serve use data. Then, the server interface 3009 delivers the packet data to the server 2901 through the server connection cable 3010. According to the structure of FIG. 30(*b*), packet data supplied from one of a plurality of pieces of terminal equipment electrically connected to the extensions 105 is first received by the extension control 3005, and then passes through the TDN path 3002, followed by delivering to the CPU 3003. The CPU 3003 then delivers the received server use data to the computer is interface 3011 via the CPU bus 3007. After that, the computer interface 3011 sends the packet data to the packet exchange 3013 of the computer 3012 provided outwardly of the PBX 2900. Further, the server use data is supplied from the packet exchange 3013 to the computer interface 3011, which, in turn, sends the server user data to the server interface 3009 electrically connected to the CPU bus 3007 identical to that previously used. Then, the server interface 3009 transmits the data to the server 2901 through the server connection cable 3010. The server 2901 shown in FIG. 30 differs from the server illustrated in FIG. 4 and in that a communication interface of the server 2901 is electrically connected to the server connection cable unlike the communication interface of the server shown in FIGS. 4 and 6. Other elements of structure and functions are identical to those in the first embodiment.

FIG. 31 shows an extension table 3100 managed by a packet control 701 of the PBX 2900 employed in the second embodiment of the present invention. The extension table 3100 includes a terminal identification number 3102, a user ID 3103, a logical channel number 3104 and a server 3105 as a destination for each extension 3101 in the same manner as the extension table 800 shown in FIG. 8. However, each server is not registered on the extension table 3100.

FIG. 32 illustrates a server table 3200 controlled by a packet control 701 of another PBX 2900 employed in the second embodiment of the present invention. The server table 3200 differs from the server table 900 shown in FIG. 9 in that elements descriptive of the extension number of the server are unnecessary because the server 2901 is directly connected to the CPU bus 3007, and a server name 3201 and a server's address 3202 on the CPU bus represents information annexed to the server. In addition, the server table 3200 includes a logical channel number 3203, a user ID of destination 3204 and a user's extension number 3205 which are employed as information about the user who makes use of a server. By making use of these tables, servers can be utilized from terminal equipment connected to extensions respectively, even in the case of the PBX server system according to the second embodiment.

According to the second embodiment, data is sent to a server directly connected to a PBX. It is therefore possible to carry out data transmission between the PBX and the server at a high speed and to improve the response to a user.

Even in the case of the first and second embodiments, request messages and data for the entry of a user and a sever in the system have been transmitted using user data regions of packets for control data communication, such as a connection request packet, a call connected packet. However, they can also be transmitted using a data packet after a packet link has been set up.

Having now fully described the invention, it will be apparent to those skilled in the art that many changes and modifications can be made without departing from the spirit or scope of the invention as set forth herein.

What is claimed is:

1. A method of user registration employed by a packet exchanger provided with an exchanger unit connected with a plurality of data processing devices and server devices through a communications line and transmitting, upon receipt of a data packet from any of the data processing devices, the data packet to a destination data processing device comprising the steps of:

receiving a first data packet including first user ID information from a first data processing device over the communications line;

transmitting the received first user ID information to a user ID checking unit making a check to determine whether the user ID information is correct;

registering terminal ID information of said first data processing device; and registering, based on data of permission received from said user ID checking unit, said first user ID information and first logical channel information, which is designated when data is transmitted to a first server device, in association with said terminal ID information.

2. A method of user registration employed by a packet exchanger provided with an exchanger unit connected with a plurality of data processing devices and server devices through a communications line and transmitting, upon receipt of a data packet from any of the data processing devices, the data packet to a destination data processing device comprising the steps of:

receiving a first data packet including first user ID information from a first data processing device over the communications line;

transmitting the received first user ID information to a user ID checking unit making a check to determine whether the user ID information is correct;

registering terminal ID information of said first data processing device; and registering, based on data of permission received from said user ID checking unit, said first user ID information in association with said terminal ID information and transmitting first logical channel information, which is designated when data is transmitted from said first data processing device to a first server device, to said first data processing device over the communications line.

3. A method of user registration employed by a packet exchanger provided with an exchanger unit connected with a plurality of data processing devices and server devices through a communications line and transmitting, upon receipt of a data packet from any of the data processing devices, the data packet to a destination data processing device comprising the steps of:
receiving a first data packet including first user ID information from a first data processing device over the communications line;
transmitting the received first user ID information to a user ID checking unit making a check to determine whether the user ID information is correct;
registering terminal ID information of said first data processing device in association with a connection number to which said first data processing device is connected; and
registering, based on data of permission received from said user ID checking unit, first logical channel information, which is designated when data is transmitted to a first server device, in association with said connection number.

4. A method of user registration employed by a packet exchanger provided with an exchanger unit connected with a plurality of data processing devices and server devices through a communications line and transmitting, upon receipt of a data packet from any of the data processing devices, the data packet to a destination data processing device comprising the steps of:
receiving a first data packet including first user ID information from a first data processing device over the communications line;
transmitting the received first user ID information to a user ID checking unit making a check to determine whether the user ID information is correct;
registering terminal ID information of said first data processing device in association with a connection number to which said first data processing device is connected; and
transmitting, based on data of permission received from said user ID checking unit, first logical channel information, which is specified when data is transmitted from said first data processing device to a first server device, to said first data processing device over the communications line.

5. A method of user registration employed by a packet exchanger provided with an exchanger unit connected with a plurality of data processing devices and server devices through a communications line and transmitting, upon receipt of a data packet from any of the data processing devices, the data packet to a destination data processing device comprising the steps of:
receiving a first data packet including first user ID information from a first data processing device over the communications line;
transmitting the received first user ID information to a user ID checking unit making a check to determine whether the user ID information is correct;
registering terminal ID information of said first data processing device in association with a connection number to which said first data processing device is connected; and
registering, based on data of permission received from said user ID checking unit, said first user ID information and first logical channel information, which is designated when data is transmitted to a first server device, in association with said connection number.

6. A method of user registration employed by a packet exchanger provided with an exchanger unit connected with a plurality of data processing devices and server devices through a communications line and transmitting, upon receipt of a data packet from any of the data processing devices, the data packet to a destination data processing device comprising the steps of:
receiving a first data packet including first user ID information from a first data processing device over the communications line;
transmitting the received first user ID information to a user ID checking unit making a check to determine whether the user ID information is correct;
registering terminal ID information of said first data processing device in association with a connection number to which said first data processing device is connected; and
registering, based on data of permission received from said user ID checking unit, said first user ID information in association with said connection number and transmitting first logical channel information, which is specified when data is transmitted from said first data processing device to a first server device, to said first data processing device over the communications line.

7. The method of user registration according to claim 6, wherein said first data packet includes a first password; and when the transmission to said user ID checking unit is made, said first password is transmitted together with said first user ID information.

8. A data packet exchanger comprising:
a line control unit connected with a plurality of data processing devices for each connection number through a communications line;
a memory unit for storing information of the data processing device for each of the connection numbers; and
a packet control unit, upon receipt by said line control unit of a first data packet including first user ID information from a first data processing device over the communications line, transmitting the received first user ID information to a user ID checking unit making a check to determine whether the user ID information is correct and, based on data of permission received from said user ID checking unit, allowing said memory unit to store said first user ID information and terminal ID information of said first data processing device in association with a connection number corresponding to said first data processing device.

9. The data packet exchanger according to claim 8, wherein said packet control unit further allows said memory unit to store first logical channel information, which is designated when data is transmitted to a first server device connected therewith through the communications line, in association with the connection number corresponding to said first data processing device.

10. The data packet exchanger according to claim 8, wherein said packet control unit further allows said line control unit to transmit the first logical channel information, which is designated when data is transmitted from said first data processing device to a first server device, to said first data processing device.

* * * * *